United States Patent
Zarli et al.

(10) Patent No.: US 11,929,524 B2
(45) Date of Patent: Mar. 12, 2024

(54) SEPARATOR PLATE FOR A PROTON-EXCHANGE MEMBRANE FUEL CELL

(71) Applicant: Spectronik Pte. Ltd., Singapore (SG)

(72) Inventors: Maung Maung Zarli, Singapore (SG); Jogjaman Jap, Singapore (SG); Hao Shen, Singapore (SG)

(73) Assignee: Spectronik Pte. Ltd., Singapore (SG)

( * ) Notice: Subject to any disclaimer, the term of this patent is extended or adjusted under 35 U.S.C. 154(b) by 436 days.

(21) Appl. No.: 16/848,686

(22) Filed: Apr. 14, 2020

(65) Prior Publication Data

US 2021/0320310 A1    Oct. 14, 2021

(51) Int. Cl.
| | |
|---|---|
| *H01M 8/0267* | (2016.01) |
| *H01M 8/0258* | (2016.01) |
| *H01M 8/1004* | (2016.01) |
| *H01M 8/2483* | (2016.01) |
| *H01M 8/2485* | (2016.01) |
| *H01M 8/10*   | (2016.01) |

(52) U.S. Cl.
CPC ....... *H01M 8/0267* (2013.01); *H01M 8/0258* (2013.01); *H01M 8/1004* (2013.01); *H01M 8/2483* (2016.02); *H01M 8/2485* (2013.01); *H01M 2008/1095* (2013.01)

(58) Field of Classification Search
CPC ............. H01M 8/0267; H01M 8/2485; H01M 8/2483; H01M 8/0258; H01M 8/1004; H01M 2008/1095
See application file for complete search history.

(56) References Cited

U.S. PATENT DOCUMENTS

| | | | | |
|---|---|---|---|---|
| 5,514,487 | A  * | 5/1996 | Washington | H01M 8/04074 |
| | | | | 429/461 |
| 6,042,955 | A  * | 3/2000 | Okamoto | H01M 8/0228 |
| | | | | 429/514 |
| 2003/0152819 | A1 * | 8/2003 | Hatoh | H01M 8/0267 |
| | | | | 429/437 |
| 2006/0210857 | A1 | 9/2006 | Frank et al. | |
| 2007/0003821 | A1 | 1/2007 | Belchuk | |
| 2015/0044590 | A1 * | 2/2015 | Blank | H01M 8/2483 |
| | | | | 429/434 |
| 2018/0115007 | A1 * | 4/2018 | Sato | H01M 8/2465 |
| 2019/0097256 | A1 * | 3/2019 | Quatannens | H01M 8/2425 |

* cited by examiner

*Primary Examiner* — James Lee
(74) *Attorney, Agent, or Firm* — Eric D. Babych; Barnes & Thornburg LLP

(57) ABSTRACT

The present disclosure provides a separator plate suitable for use in a proton-exchange membrane fuel cell. Also provided is a fuel cell and an article including the separator plate. Further, the present disclosure provides a fuel cell stack where each fuel cell includes the separator plate. Additionally, a closed-cathode proton-exchange membrane fuel cell stack is disclosed.

20 Claims, 17 Drawing Sheets

SEPARATOR PLATE FOR A PROTON-EXCHANGE MEMBRANE FUEL CELL

STATEMENT REGARDING PRIOR DISCLOSURES BY THE INVENTOR

A fuel cell was confidentially offered for sale to a specific buyer by the Applicant in December of 2018 and the fuel cell was delivered to the buyer in February of 2020. Prior to delivery, none of the novel features of the presently claimed invention were made available to the buyer.

FIELD OF THE INVENTION

The present invention relates to a separator plate suitable for use in a proton-exchange membrane fuel cell, to a fuel cell comprising the separator plate and to a fuel cell stack where each fuel cell comprises the separator plate.

BACKGROUND

Proton-exchange membrane (PEM) fuel cells include an anode, a cathode, an electrolyte membrane, which may comprise a catalyst, and a gas diffusion layer on each side of the membrane, between the anode and cathode. Hydrogen gas is supplied to the anode side of the membrane, where the hydrogen is split into protons (H+) and electrons (e⁻). The electrons flow through the anode and an external circuit to the cathode, creating the electrical current output and heat. Meanwhile, the protons permeate across the membrane to the cathode side. Oxygen gas (in the form of air or an enriched oxygen source) is supplied to the cathode side of the membrane, where the oxygen molecules react with the protons and electrons flowing to the cathode to form water molecules.

The electrical potential of a single cell is limited, and the potential can be increased by placing more cells together in a "stack", where the potential of the stack is the sum of the potential of each cell.

It is desirable to use air as the oxygen source for the cathode, because using enriched oxygen requires that the system be hermetically sealed. The use of an enriched oxygen source also introduces additional safety concerns due to the reactivity of high purity oxygen gas and presence of rich hydrogen. Conventional PEM fuel cells are constructed from a series of separator plates that function as the anode/cathode electrodes and have a flow field in direct or indirect contact with the membrane across which the fuel/oxidant gas can flow. The plates comprise integrated manifold apertures fluidly connected to the flow field. These integrated manifold apertures form an integrated manifold when the plates are stacked on top of each other to form a cell. The fuel gas (hydrogen) and oxidant (oxygen) can be supplied to the respective flow field through the integrated manifold formed by the integrated manifold apertures.

The larger a stack, the more fuel (hydrogen) and oxidant (oxygen) and coolant is required in order to supply each cell with enough reactants. For a small stack, an integrated manifold formed from small integrated manifold apertures can provide sufficient gas to each cell. However, since it is preferable to use uncompressed air as the oxidant source for the cathode, and air is only about 21% oxygen, large integrated manifold apertures are required in order to provide sufficient oxygen to a large stack. This means that the separator plates for different sized stacks must have different sized integrated manifold apertures in order to achieve the same reaction rate. This means that every stack is essentially bespoke, thereby increasing the complexity of manufacturing and manufacturing costs, as well as limiting design freedom because the required size of the manifold is determined by the number of cells in the stack and additional features or openings cannot readily be incorporated into the manifold.

BRIEF SUMMARY OF THE INVENTION

The present inventors have surprisingly found that the required gases can be supplied to PEM fuel cells formed from separator plates that do not need to include an integrated manifold aperture for one or more of the desired gases (e.g. hydrogen, air as an oxidant and air (or other liquid) for cooling). This is achieved by removing the conventional manifold aperture to create an inlet portion for the gas to be supplied and connecting this to a separate ducting member to supply the desired gas. It will be appreciated that the ducting will be configured to transport sufficient fluid to the stack that it is to be attached to. Advantageously, this means that the separator plates can have a standard design for a wide range of stack sizes, thereby reducing costs and making it easier to make fuel cells for a range of different uses— simply by varying the size of the fuel cell stack (i.e. the number of fuel cells in the stack) and the ducting that is attached thereto. Further advantages associated with this arrangement will be discussed in more detail hereinbelow.

The present invention therefore provides the following.

1. A separator plate suitable for use in a closed-cathode proton-exchange membrane (PEM) fuel cell, the separator plate comprising a first set of fluid flow channels each extending from an inlet at a first edge portion of the separator plate to an outlet at a second edge portion or manifold aperture portion of the separator plate, wherein:
   the first set of fluid flow channels comprises one or more fluid flow channels, where the one or more fluid flow channels extend across the first edge portion.
2. The separator plate according to Clause 1, wherein the separator plate is selected from: a cathode separator plate, an anode separator plate, and a coolant separator plate, optionally wherein the separator plate is selected from a cathode separator plate, and a coolant separator plate.
3. The separator plate according to Clause 2, wherein the separator plate comprises the first set of fluid flow channels on a first face of the plate, and a second set of fluid flow channels on a second face of the plate, optionally wherein the first set of fluid flow channels are fluidly separated from the second set of fluid flow channels.
4. The separator plate according to Clause 3, wherein:
   (a) the first set of fluid flow channels are cathode or anode fluid flow channels and the second set of fluid flow channels are coolant fluid flow channels, or
   (b) the first set of fluid flow channels are cathode fluid flow channels and the second set of fluid flow channels are anode fluid flow channels, where the separator plate further comprises coolant fluid flow channels within the separator plate between the cathode fluid flow channels and the anode fluid flow channels.
5. The separator plate according to any one of Clauses 2 to 4, wherein the separator plate is a cathode separator plate.
6. The separator plate according to any one of Clauses 2 to 5, wherein:
   the separator plate comprises a first corner formed by a first edge and a second edge adjacent to the first edge;

the first edge portion of the separator plate extends substantially to the first edge of the separator plate and substantially to the second edge of the separator plate; and the first set of fluid flow channels comprises a plurality of fluid flow channels that extend across the first edge portion and substantially to the first and second edges of the separator plate.

7. The separator plate according to any one of the preceding clauses, wherein the first set of fluid flow channels each extend to an outlet at a second edge portion of the separator plate.

8. The separator plate according to any one of the preceding clauses, wherein the separator plate does not comprise one or more of the following:
an integrated cathode inlet manifold aperture;
an integrated anode inlet manifold aperture; and
an integrated coolant inlet manifold aperture.

9. The separator plate according to any one of the preceding clauses, wherein the separator plate does not comprise one or more of the following:
an integrated cathode outlet manifold aperture;
an integrated anode outlet manifold aperture; and
an integrated coolant outlet manifold aperture.

10. The separator plate according to any one of the preceding clauses, wherein the fluid flow channels define a flow field, and the separator plate comprises one or two of the following:
an integrated cathode inlet manifold aperture that extends beyond the edge of the flow field;
an integrated anode inlet manifold aperture that extends beyond the edge of the flow field; and
an integrated coolant inlet manifold aperture that extends beyond the edge of the flow field.

11. The separator plate according to any one of the preceding clauses, wherein the fluid flow channels define a flow field, and the separator plate comprises one or two of the following:
an integrated cathode outlet manifold aperture that extends beyond the edge of the flow field;
an integrated anode outlet manifold aperture that extends beyond the edge of the flow field; and
an integrated coolant outlet manifold aperture that extends beyond the edge of the flow field.

12. The separator plate according to any one of the preceding clauses, wherein the separator plate is adapted to connect to a ducting in an appropriately fluidly sealed manner when the separator plate is placed in a fuel cell stack, optionally wherein the separator plate is adapted to connect to a ducting at the first and/or second edge portions.

13. An article comprising a separator plate according to any one of the preceding clauses and one ducting plate attached to the separator plate by an interlocking connection, where the ducting plate defines an inner ducting volume in fluid communication with the inlet(s) of the first set of fluid flow channels of the separator plate, optionally wherein the article comprises one or two additional separator plates and a membrane electrode assembly.

14. A closed-cathode proton-exchange membrane (PEM) fuel cell comprising at least one separator plate as described in any one of Clauses 1 to 12.

15. The closed-cathode proton-exchange membrane (PEM) fuel cell according to Clause 14, wherein the at least one separator plate as described in any one of Clauses 1 to 12 is:
(a) a cathode separator plate;
(b) an anode separator plate; or
(c) a coolant separator plate.

16. The closed-cathode proton-exchange membrane (PEM) fuel cell according to Clause 15, wherein at least two of the separator plates are as described in any one of Clauses 1 to 12, and are:
(a) the cathode separator plate and the anode separator plate;
(b) the cathode separator plate and the coolant separator plate; and
(c) the anode separator plate and the coolant separator plate.

17. The closed-cathode proton-exchange membrane (PEM) fuel cell according to Clause 16, comprising a cathode separator plate, an anode separator plate and a coolant separator plate, wherein all three of the separator plates are as described in any one of Clauses 1 to 12.

18. The closed-cathode proton-exchange membrane (PEM) fuel cell according any one of Clauses 14 to 17, comprising a first ducting having at least one ducting inlet and an inner ducting volume in fluid communication with the at least one ducting inlet,
wherein:
the inner ducting volume of the first ducting is in fluid communication with the inlet(s) of the first set of fluid flow channels of the at least one separator plate as described in any one of Clauses 1 to 12; and
the first ducting is formed from one or more interlocking ducting plates.

19. A closed-cathode proton-exchange membrane (PEM) fuel cell stack comprising:
(i) two or more fuel cells, each of the two or more fuel cells comprising:
a first separator plate as described in any one of Clauses 1 to 12; and
one or more additional separator plates; and
(ii) a first ducting having at least one ducting inlet and an inner ducting volume in fluid communication with the at least one ducting inlet,
wherein:
the inner ducting volume of the first ducting is in fluid communication with the inlets of the first set of fluid flow channels of the first separator plates; and
the one or more additional separator plates are arranged or adapted to accommodate the presence of the first ducting.

20. The closed-cathode proton-exchange membrane (PEM) fuel cell stack according to Clause 19, wherein the one or more additional separator plates are fluidly separated from said first ducting.

21. The closed-cathode proton-exchange membrane (PEM) fuel cell stack according to Clause 19 or 20, wherein the one or more additional separator plates are separator plates as described in any one of Clauses 1 to 12.

22. The closed-cathode proton-exchange membrane (PEM) fuel cell stack according to any one of Clauses 19 to 21, wherein the first separator plates are cathode separator plates.

23. The closed-cathode proton-exchange membrane (PEM) fuel cell stack according to Clause 22, wherein:
the cathode separator plates are separator plates according to Clause 6; and
the inner ducting volume of the first ducting is in fluid communication with the inlets of the first set of fluid flow channels of the first separator plates.

24. The closed-cathode proton-exchange membrane (PEM) fuel cell stack according to any one of Clauses 19 to 23, wherein:
(a) the first separator plates comprise fluid flow channels for a coolant fluid; and/or
(b) one or more of the one or more additional separator plates comprises fluid flow channels for a coolant fluid;

wherein in (a) and (b), the inlets of the fluid flow channels for a coolant fluid are separate to the inlets of the remaining fluid flow channels of the first and one or more additional separator plates, optionally wherein the fluid flow channels for a coolant fluid are located on a separator plate that comprises cathode fluid flow channels or anode fluid flow channels, and the fluid flow channels for a coolant fluid are located on the opposite face of the separator plate to the cathode fluid flow channels or anode fluid flow channels.

25. The closed-cathode proton-exchange membrane (PEM) fuel cell stack according to any one of Clauses 19 to 24, wherein the first ducting comprises at least two inlets.

26. The closed-cathode proton-exchange membrane (PEM) fuel cell stack according to any one of Clauses 19 to 25, wherein the at least one ducting is shaped such that fluid approaching the inlets of the first set of fluid flow channels flows in a direction that is substantially parallel to the inlets of one or more of the first set of fluid flow channels with which the inner ducting volume is in fluid communication.

27. The closed-cathode proton-exchange membrane (PEM) fuel cell stack according to any one of Clauses 19 to 26, wherein the first ducting is configured to increase or decrease the fluid flow rate through one or more of the fluid flow channels.

28. The closed-cathode proton-exchange membrane (PEM) fuel cell stack according to Clause 27, wherein the first ducting comprises fins or protrusions configured to direct fluid flowing through the ducting into one or more of the fluid flow channels.

29. The closed-cathode proton-exchange membrane (PEM) fuel cell stack according to any one of Clauses 19 to 28, wherein the first ducting is shaped to restrict fluid flow through a portion of the ducting.

30. The closed-cathode proton-exchange membrane (PEM) fuel cell stack according to any one of Clauses 19 to 29, wherein the first ducting comprises a recirculation portion configured to direct fluid flowing through a distal portion of the first ducting, relative to the at least one ducting inlet, towards one or more fluid flow channels located proximal to the at least one ducting inlet, relative to the distal portion of the first ducting.

31. The closed-cathode proton-exchange membrane (PEM) fuel cell stack according to any one of Clauses 19 to 30, wherein the first ducting comprises a first ducting portion configured to direct a first portion of fluid flowing through the first ducting to a first set of fuel cells, and a second ducting portion configured to direct a second portion fluid flowing through the first ducting to a second set of fuel cells.

32. The closed-cathode proton-exchange membrane (PEM) fuel cell stack according to any one of Clauses 19 to 31, wherein:
   a) the first ducting comprises a humidification means located within the first ducting; or
   b) the first ducting comprises at least two inlets, and the closed-cathode proton-exchange membrane (PEM) fuel cell stack comprises a humidification means proximal to the at least two inlets, where the humidification means is/are configured to humidify gas flowing through the first ducting.

33. The closed-cathode proton-exchange membrane (PEM) fuel cell stack according to any one of Clauses 19 to 32, comprising a second ducting having at least one second ducting inlet and an inner ducting volume in fluid communication with the at least one second ducting inlet, where the inner ducting volume of the second ducting is in fluid communication with one or more fluid flow channels other than the fluid flow channels in fluid communication with the inner ducting volume of the first ducting.

34. The closed-cathode proton-exchange membrane (PEM) fuel cell stack according to Clause 33, comprising a third ducting having at least one third ducting inlet and an inner ducting volume in fluid communication with the at least one third ducting inlet, where the inner ducting volume of the third ducting is in fluid communication with one or more fluid flow channels other than the fluid flow channels in fluid communication with the inner ducting volume of the first ducting or the second ducting.

35. The closed-cathode proton-exchange membrane (PEM) fuel cell stack according to any one of Clauses 19 to 34, wherein the ducting is formed from a thermally and/or electrically insulating material.

36. The closed-cathode proton-exchange membrane (PEM) fuel cell stack according to any one of Clauses 19 to 35, further comprising means or apparatus configured to increase the flow of fluid out of the cathode and/or coolant fluid flow channels, optionally wherein said means or apparatus comprises a suction pump, further optionally wherein said suction pump is configured to recirculate fluid to the inlets of the cathode and/or coolant fluid flow channels.

37. The closed-cathode proton-exchange membrane (PEM) fuel cell stack according to any one of Clauses 19 to 36, further comprising means or apparatus for restricting the flow of fluid out of the cathode and/or coolant fluid flow channels.

38. The closed-cathode proton-exchange membrane (PEM) fuel cell stack according to any one of Clauses 19 to 37, wherein at least one of the first, second and/or third ductings, when present, comprises a mount for a blower or pump.

39. The closed-cathode proton-exchange membrane (PEM) fuel cell stack according to any one of Clauses 19 to 38, wherein any of the first, second and/or third ductings, when present, are formed from a plurality of interlocking ducting plates.

40. The closed-cathode proton-exchange membrane (PEM) fuel cell stack according to Clause 39, wherein the seal between adjacent interlocking ducting plates comprises a gasket.

41. The closed-cathode proton-exchange membrane (PEM) fuel cell stack according to any one of Clauses 19 to 38, wherein the ducting is formed from a first end part, a second end part, and a central part that fits inside the two end parts in an appropriately fluidly sealed manner and along which the end parts may extendably slide.

BRIEF DESCRIPTION OF THE DRAWING FIGURES

FIGS. 1a-1c show a conventional separator plates for a liquid cooled closed-cathode fuel cell. FIG. 1a shows the cathode flow field and manifold apertures. FIG. 1b shows the anode flow field and manifold apertures. FIG. 1c shows the coolant flow field and manifold apertures.

FIG. 2 shows the constituent plates of a Mercedes-Benz GLC F-CELL, and depicts the aligning of gasketed/bordered membrane electrode assembly between two separator plates. The separator plates have a conventional shape with manifold apertures.

FIGS. 3a and 3b show the different components of a PEM fuel cell. FIG. 3a shows an anode plate, a cathode plate and a membrane, (i.e. a catalyst coated membrane or membrane electrode assembly comprising gas diffusion layers) between the anode and cathode plates in contact with the flow field of each plate. FIG. 3b shows different ways in which the plates may be arranged to form a two-sided plate.

Figure 6A:
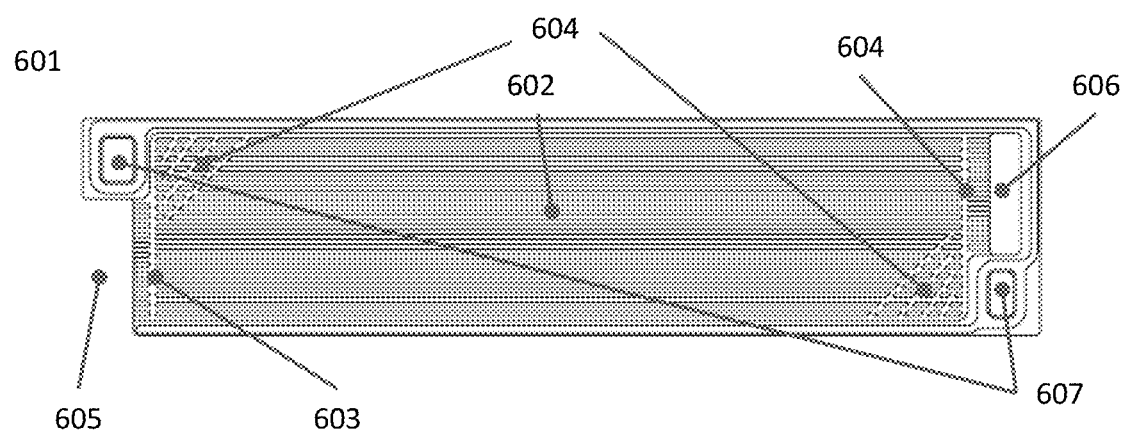
Figure 6B:
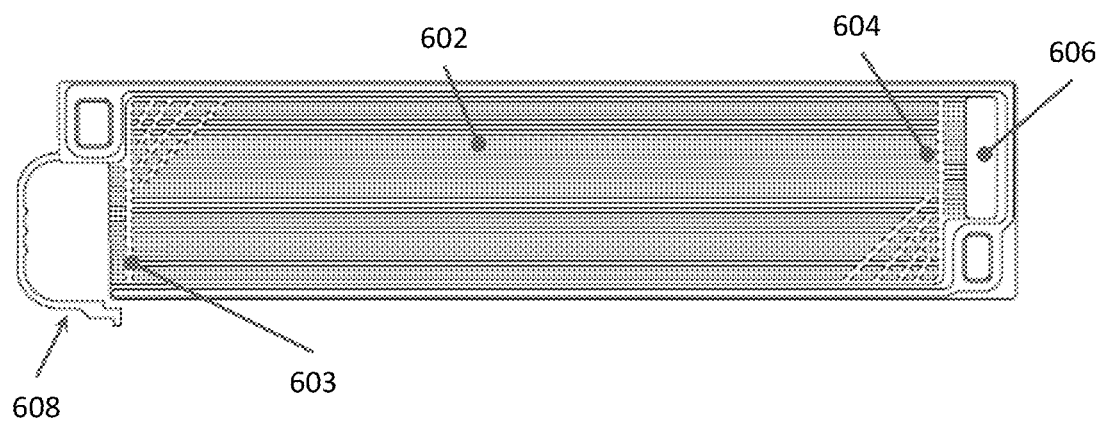
Figure 6C:
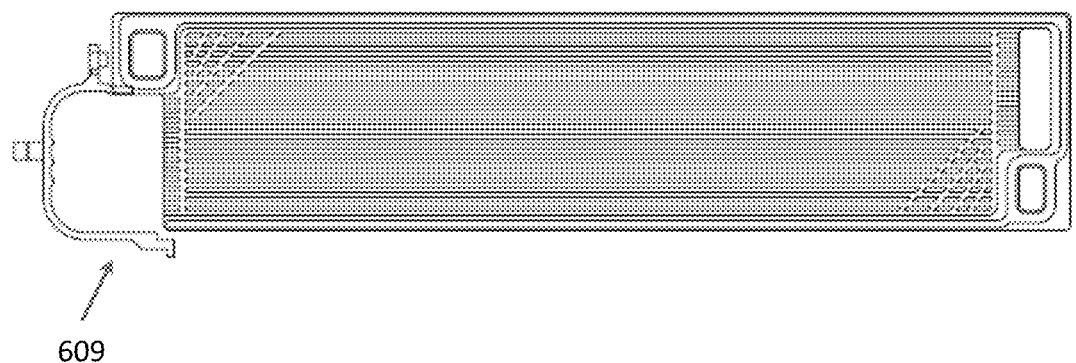

FIGS. 6a-6c show examples of cathode separator plates according to an embodiment of the invention, in which no inlet cathode manifold aperture is present. The separator plates comprise an outlet cathode manifold aperture, meaning that the fuel cell stack will form an outlet manifold for the cathode. FIG. 6a shows a separator plate with no manifold aperture, while FIGS. 6b and 6c show separator plates and ductings that provide air to the cathode fluid flow channels. The ductings are larger than typical manifold apertures and allow a greater number of fuel cells to be stacked together.

Figure 7A:
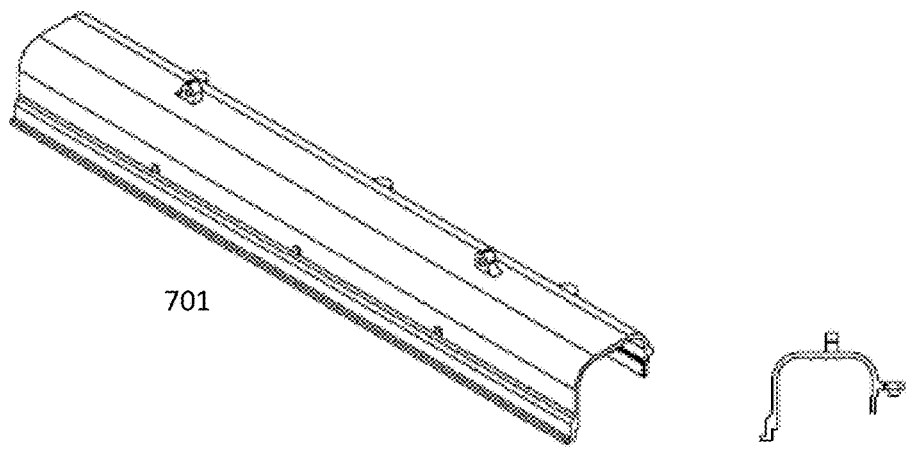
Figure 7B:
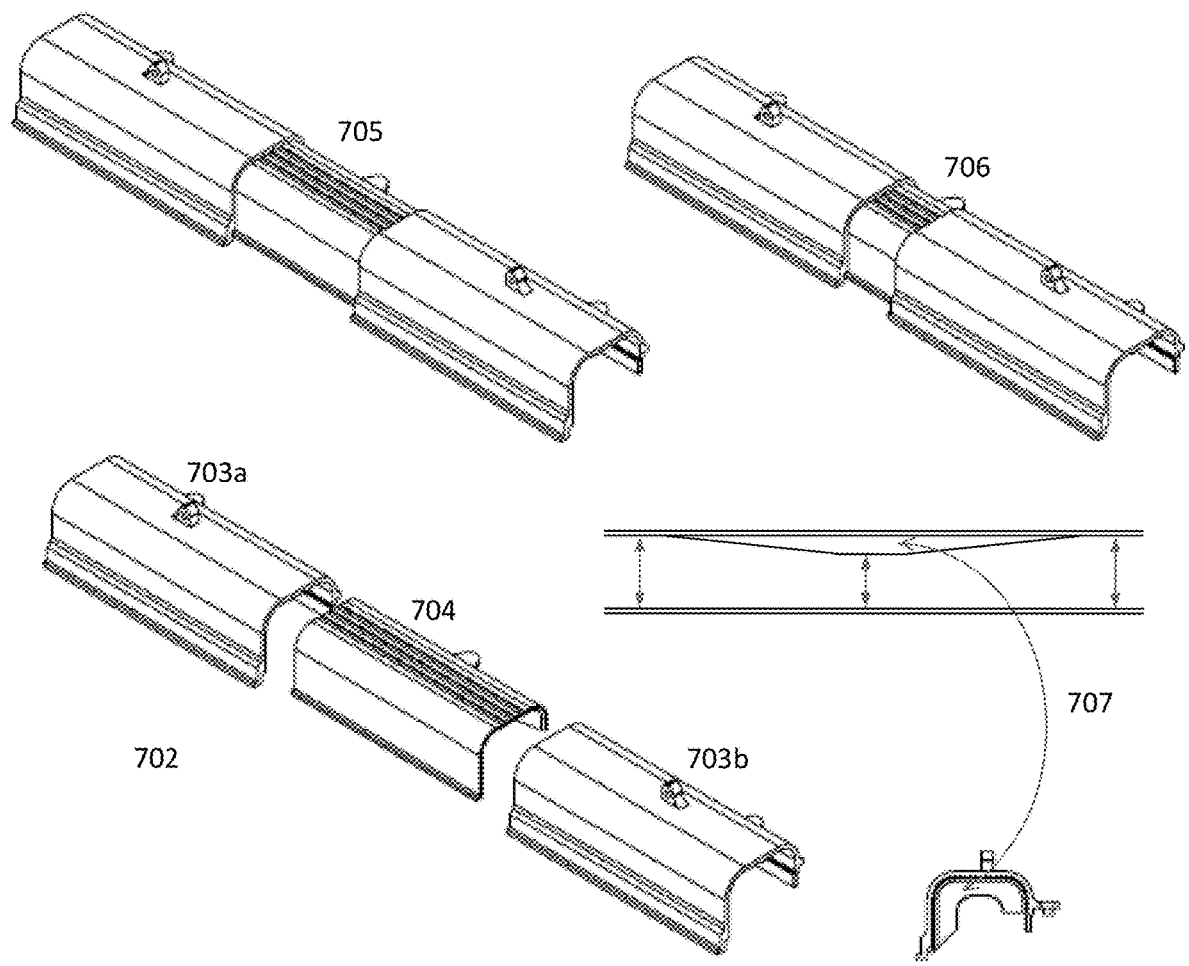

FIGS. 7a and 7b show 3D images of different types of ducting that can be attached to fuel cell stacks according to the invention. FIG. 7a shows a ducting having a fixed length, while FIG. 7b shows an adjustable ducting that is suitable for use with stacks having different cell counts. The adjustable ducting also has a contoured inner surface defining a gradually reduced cross section or orifice, which increases the resistance to fluid flow at the middle of the ducting when air is provided from each end.

Figure 8:
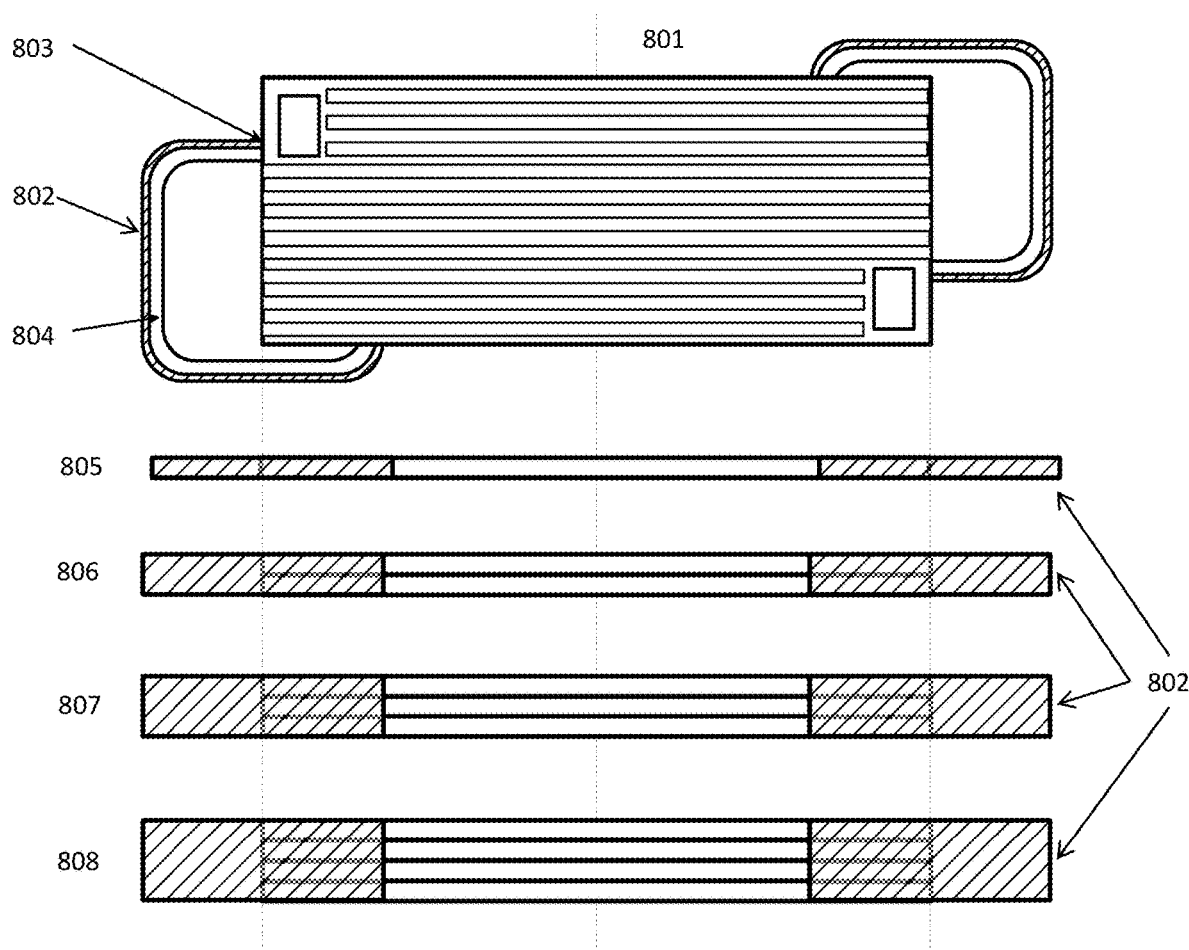

FIG. 8 shows ducting plates which can be stacked to form a prosthetic ducting for an assembly of plates, or which can be sized such that a single ducting plate forms a prosthetic ducting for said assembly of plates.

Figure 9A:
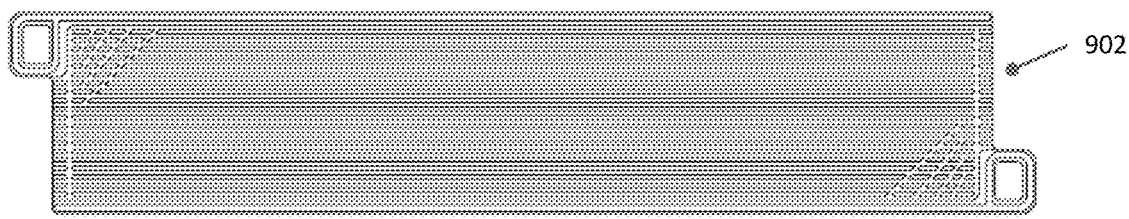
Figure 9B:
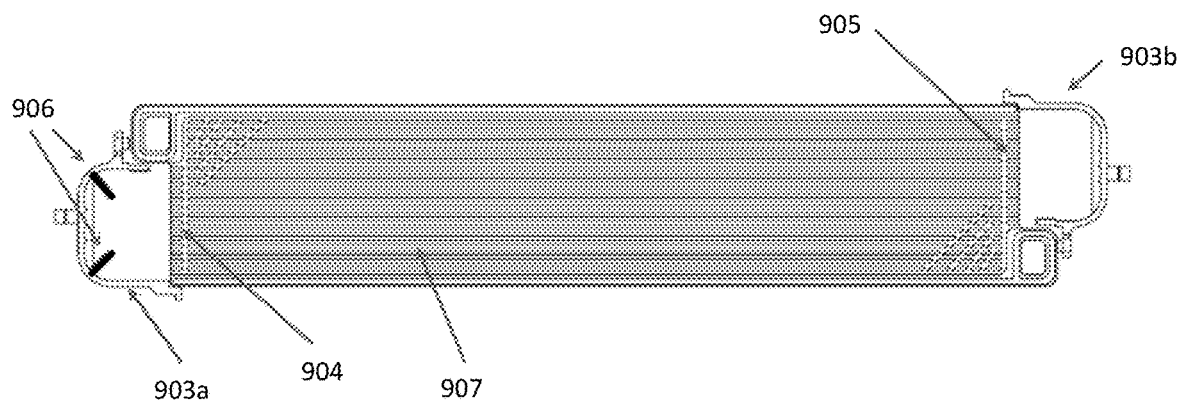

FIGS. 9a and 9b show separator plates that are longer than those in FIG. 6, and which do not comprise a cathode inlet or outlet manifold aperture. FIG. 9a shows an example of a separator plate while FIG. 9b shows a ducting attached to the inlet and outlet end of the separator plate. The ducting may comprise fins or protrusions which guide the gas flow through the ducting and can be used to direct gas into specific fluid flow channels.

Figure 10:
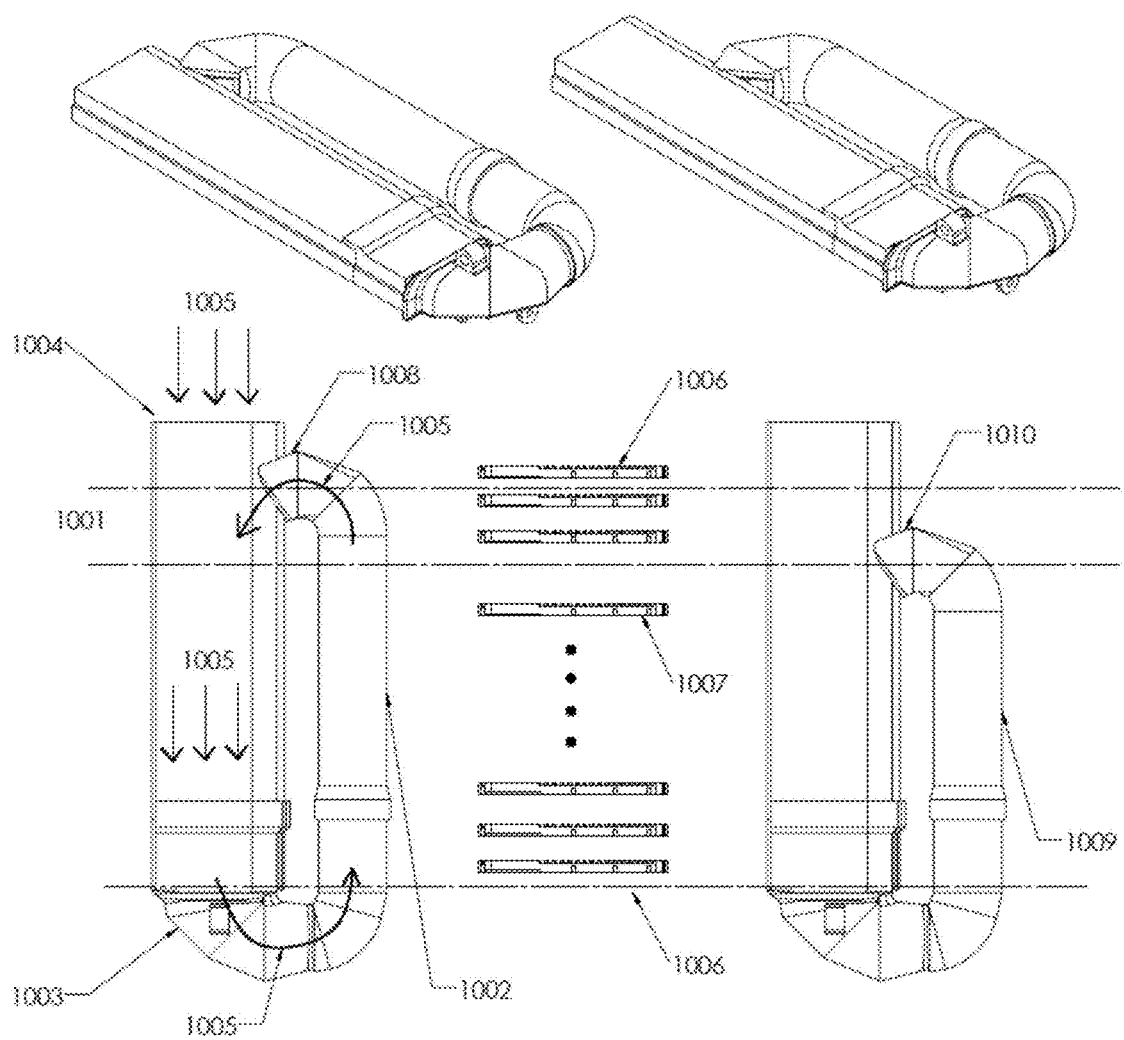

FIG. 10 shows a ducting that allows air that does not pass into a fluid flow channel to be recirculated, allowing a more even flow across the ducting. Advantageously, the ducting can be configured to introduce the recirculated air at any position along the ducting where additional fluid flow may be desirable, for example a few cells from the ducting inlet.

Figure 11:
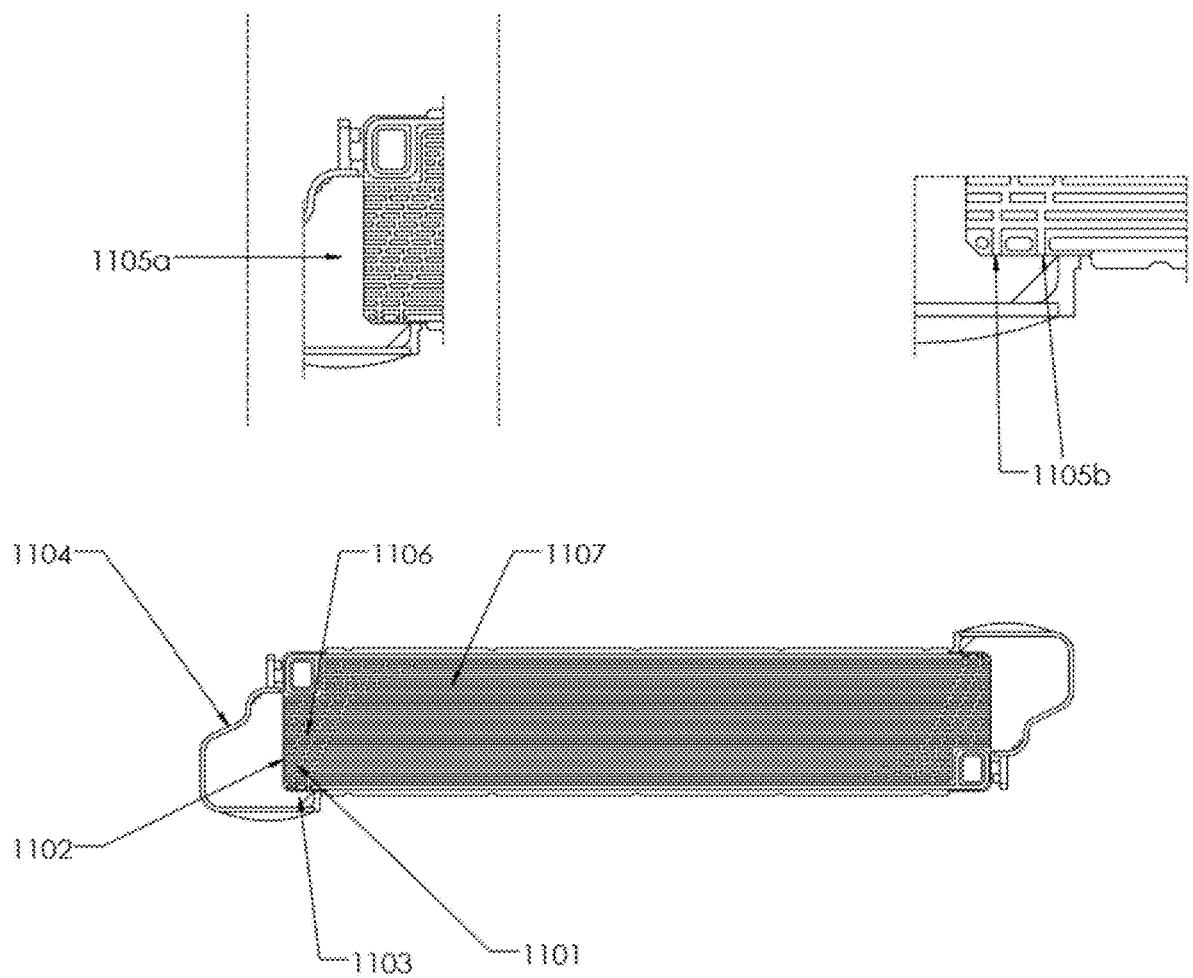

FIG. 11 shows a modified version of the separator plate shown in FIG. 9, which also comprises fluid flow channel inlets and outlets on two adjacent edges of the plate. The ducting also covers the portion of each edge that has fluid flow channel inlets. The fluid flow channels comprise pathways from the fluid flow channel inlets on the long edge of the separator plate to the channels on the opposite long edge, increasing the flow of gas through the channels furthest from the inlets.

Figure 12:
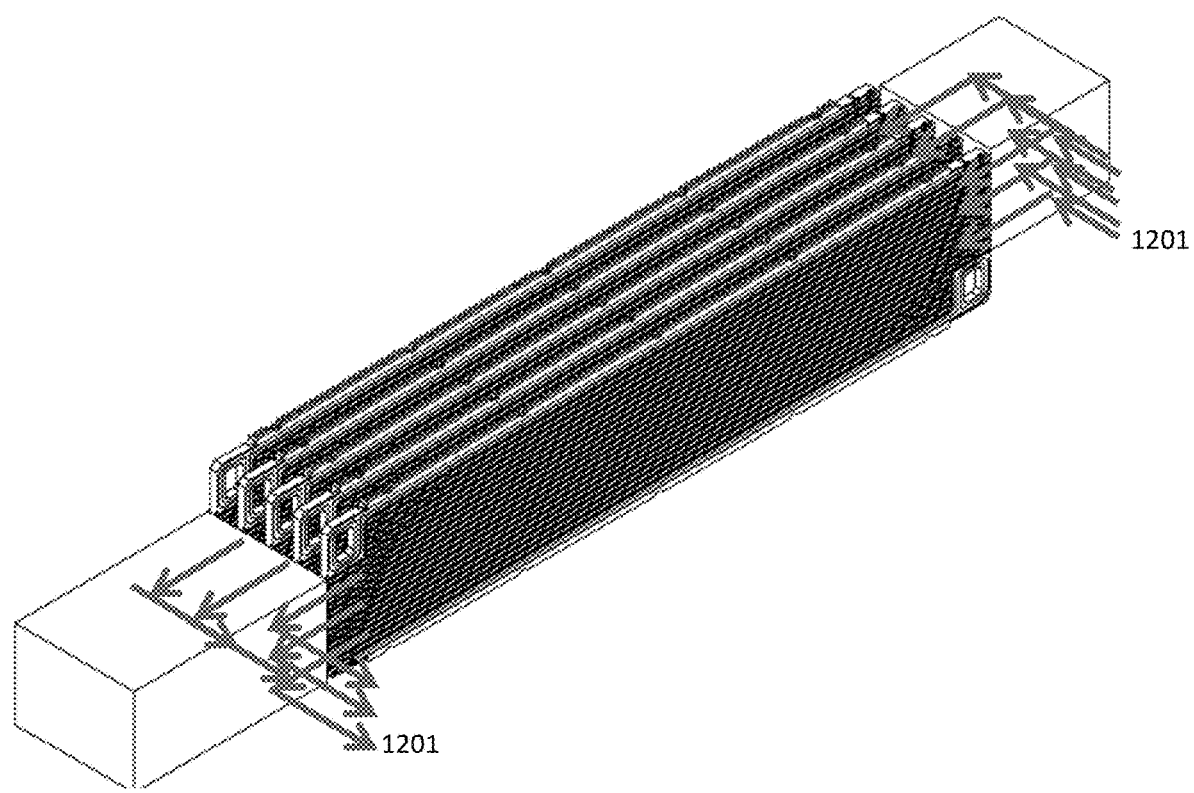

FIG. 12 shows the gas flow pathways through a conventional fuel cell stack, in which the gas travels perpendicular to the fluid flow channels through a manifold at each end of the stack, and must make a 90° turn in order to enter a fluid flow channel.

Figure 13A:
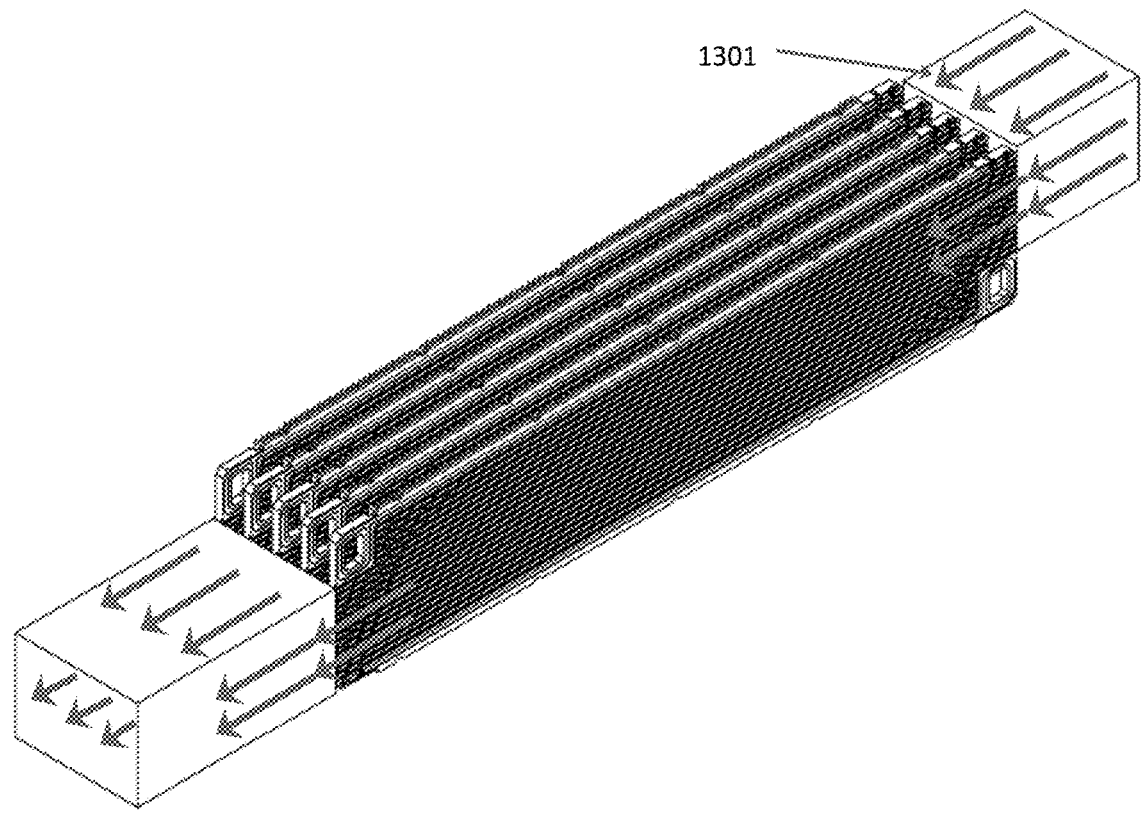
Figure 13B:
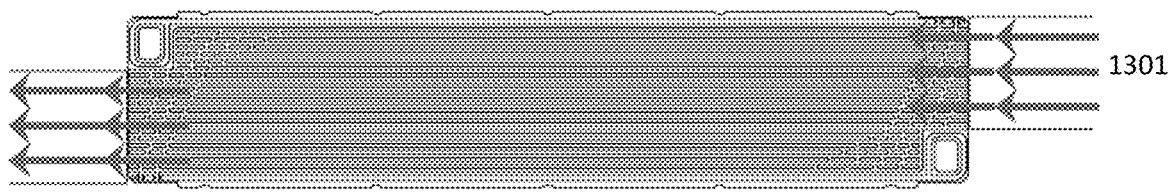

FIGS. 13a and 13b shows the gas flow pathways through a fuel stack comprising separator plates according to an embodiment of the invention, where the separator plates do not comprise cathode manifold apertures and the stack instead comprises a ducting through which gas may be delivered flowing parallel to the fluid flow channels. This increases laminar flow through the fuel cell stack.

Figure 14:
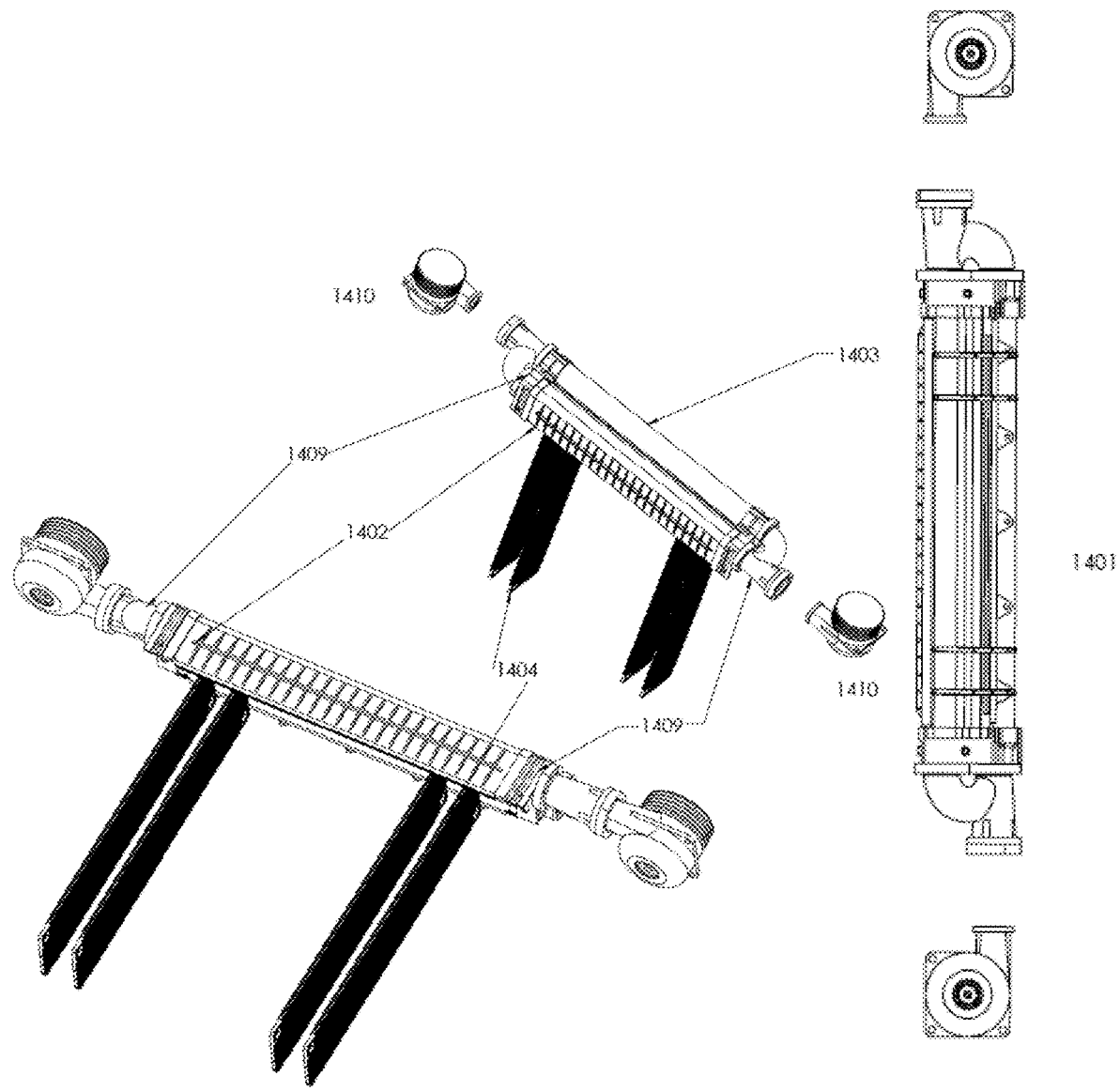

FIG. 14 shows a loop-shaped ducting comprising two portions. A first portion is adapted to connect to fluid flow channels of separator plates in a fuel cell stack, and a second portion is configured to recirculate air flowing through the first ducting. Both the first and second portions comprise ducting inlets, such that air may flow through the ducting from each end, resulting in a more even flow and pressure throughout the ducting.

Figure 15:
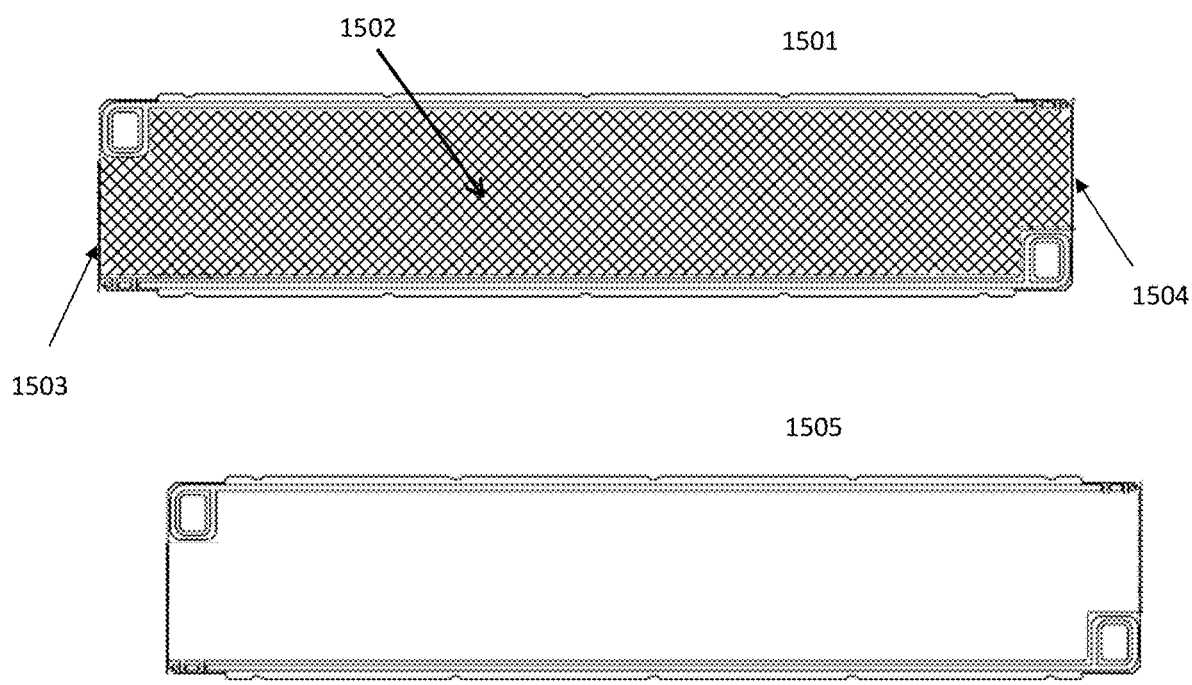

FIG. 15 shows a cathode separator plate comprising a base plate, and a mesh plate that is placed on top of the base plate to form fluid flow channels.

DETAILED DESCRIPTION

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

As used herein, the term "proton-exchange membrane fuel cell" means a fuel cell based on the reaction between protons, oxygen molecules and electrons, to form water. A person skilled in the art will understand that a proton-exchange membrane fuel cell is the same as a polymer electrolyte membrane fuel cell, both of which may be known as a PEM fuel cell.

As used herein, the term "closed-cathode" in the context of a PEM fuel cell refers to a fuel cell comprising fluid flow channels for a coolant that are not in contact with the cathode side of the membrane or a gas diffusion layer of the fuel cell.

As used herein, the term "separator plate" means a constituent plate of a PEM fuel cell that comprises fluid transfer paths or flow channels along which a fuel gas, oxidant or coolant may flow. The separator plate may be an anode separator plate, which comprises fluid flow channels for hydrogen gas and where anodic side of the reaction occurs. The separator plate may be a cathode separator plate, which comprises fluid flow channels for oxidant (e.g. air or an enriched oxygen source) and where cathodic side of the reaction occurs. The separator plate may be a coolant separator plate, which comprises fluid flow channels for a coolant (e.g. air or a liquid coolant such as water). Each separator plate generally performs its function on one of the two sides of the plate, e.g. a cathode separator plate will generally comprise fluid flow channels for an oxidant, and the reaction will occur on the side of the plate having the fluid flow channels for the oxidant (though these flow channels may comprise an underbridge on the second side of the plate). Anode separator plates, cathode separator plates and coolant separator plates may be referred to herein as anode plates, cathode plates and coolant plates, respectively.

The separator plate can have any appropriate shape. Typically the separator plate will have a polygon (e.g. rectangular) shape, but other shapes (e.g. circular or donut shape) are also possible. When the separator plate has a donut shape, the inner hole will define an inner edge of the donut, the outer circumference will define an outer edge, and fluid flow channels may run to or from the outer and/or inner edge of the plate.

As used herein, the term "fluid flow channel" means a portion of a separator plate along which fluid can flow. Fluid flow channels may be formed from valley-like depressions or recessions separated by ridges, resulting in identifiable flow paths or channels. These flow channels may have any appropriate shape, such as straight parallel (FIG. 5a), inter-digitated (FIG. 5b), spiral (FIG. 5d), single-channel serpentine (FIG. 5e), and multiple-channel serpentine (FIG. 5f). A person skilled in the art will understand that other channel configurations are possible. For example, the fluid flow channels may be formed from a large depression in a separator plate interrupted or populated by island-like protrusions, which protrusions may be arranged in a regular or irregular pattern, and may have any appropriate shape (such as a circular, square or oblique cross-section). Such a design will provide a large number of possible fluid flow channels through around the protrusions. An example of square cross-sectioned protrusions arranged in a regular manner is shown in FIG. 5c.

Fluid flow channels may also be formed from a separate mesh, grill, stencil or perforated plate that can be placed on top of a base separator plate. In this configuration, the layer forming the fluid flow channels may also act as a gas diffusion layer. An example of a mesh that can be placed on top of a base to form a separator plate according to the invention is shown in FIG. 15.

Figure 1A:
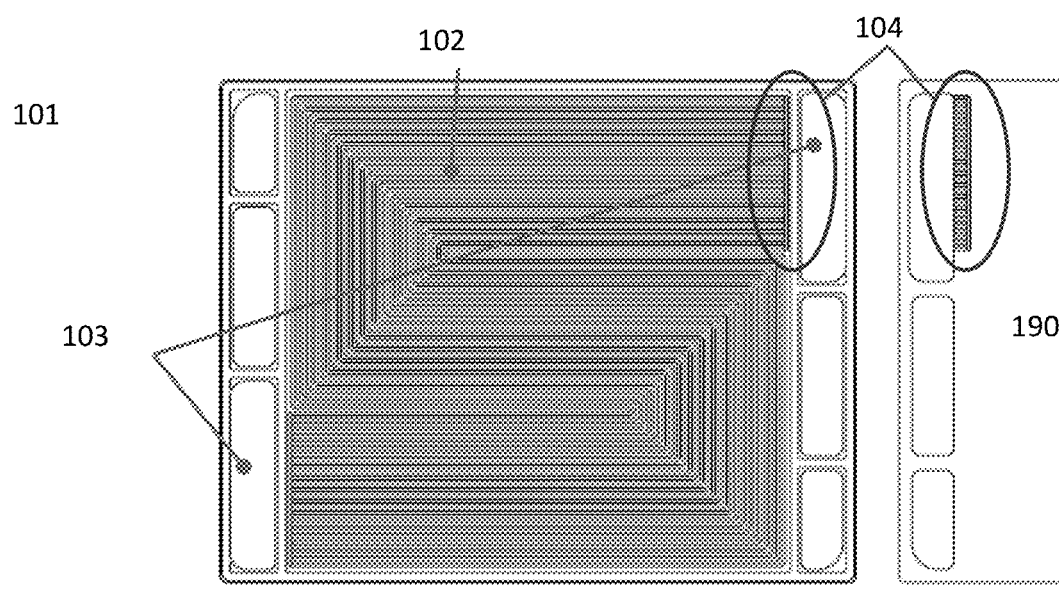
Figure 1B:
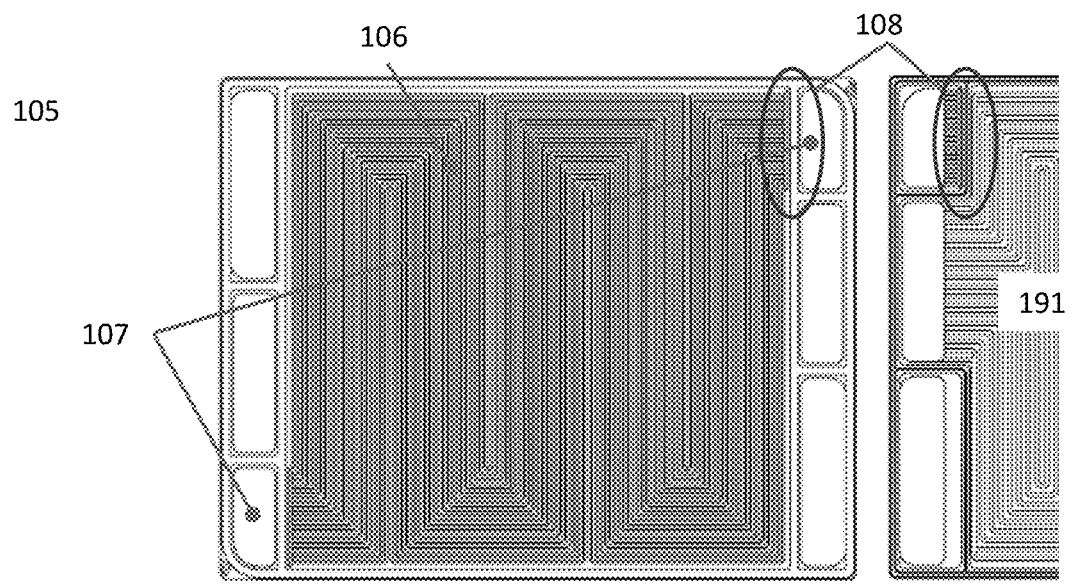
Figure 1C:
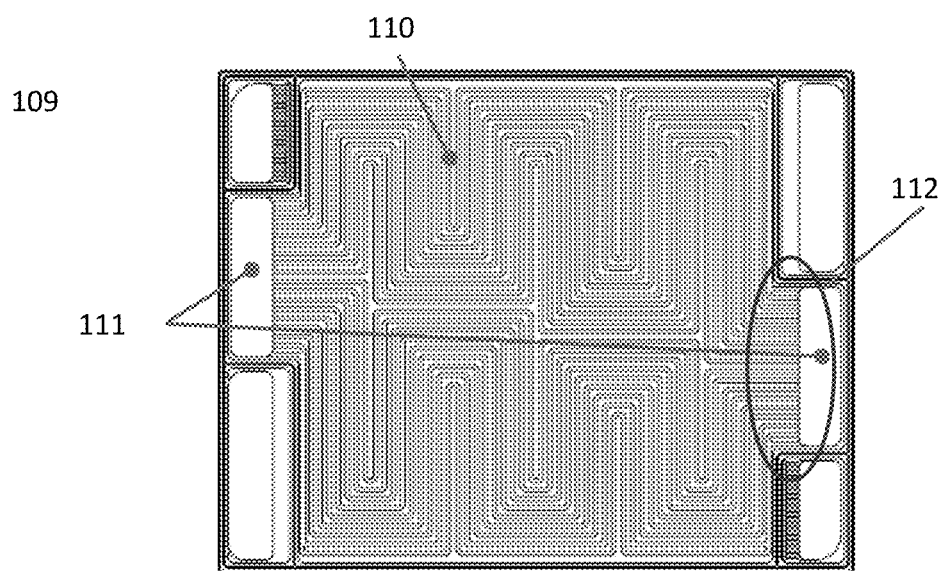

A fluid flow channel may be entirely on one face of the separator plate (see FIG. 1c). Alternatively, the fluid flow channel may comprise an "underbridge", which is a portion of the flow channel located on the opposite face of the separator plate to the majority of the fluid flow channel. The portions of the flow channel on either face of the separator plate are connected by a hole(s) or slot(s) through the separator plate. The hole may be located at any position on the separator plate, but is typically located near an edge of the separator plate. A fluid flow channel comprising an underbridge is shown in FIGS. 1a and 1b. For the avoidance of doubt, the term "fluid flow channel" as used herein includes any underbridge.

A separator plate comprising fluid flow channels involving an underbridge is distinct from a separator plate comprising fluid flow channels on both sides of the separator plate. In the former case, the underbridge means that the portions of the fluid flow channel on each side of the plate are fluidly connected, and a single fluid flow channel may have a portion on each side of the plate. In contrast, when the separator plate comprises fluid flow channels on both sides of the plate that serve different purposes (e.g. cathode fluid flow channels and coolant fluid flow channels), these fluid flow channels are not fluidly connected but are fluidly separated. This is the case when, for example, one side of the separator plate comprises fluid flow channels for cathode oxidant gas and the other side comprises fluid flow channels for a coolant. The fluid flow channels for the cathode oxidant gas and coolant will be fluidly separated. For the avoidance of doubt, the fluidly separate fluid flow channels on each side of the plate could nonetheless comprise an underbridge. A separator plate comprising cathode fluid flow channels on one side and coolant fluid flow channels on the other side could be designated as either a cathode separator plate or a coolant separator plate.

As used herein, the term "edge portion" means a portion of the separator plate at the edge of the plate. When a fluid flow channel runs to or from an edge portion of the plate, it runs to or from the outer edge of the plate, or to or from a region proximal to the outer edge of the plate. In particular, the edge portion does not comprise the portion of a conventional separator plate that interfaces between a manifold aperture and the fluid flow channels. Thus, when a fluid flow channels runs to or from an edge portion of a separator plate, the fluid flow channel does not run to or from a manifold aperture. Where a separator plate comprises a first edge portion and a second edge portion, these edge portions may be different portions of the same edge of the separator plate, or may be on different edges of the separator plate.

As used herein, the term "manifold aperture portion" refers to the portion of a separator plate that comprises a manifold aperture and the interface between the manifold aperture and the fluid flow channels.

As used herein, the term "integrated manifold aperture" refers to an integrated portion of a separator plate that comprises a manifold aperture, i.e. the manifold aperture is formed from the same piece of material as the separator plate and at the same time as fabricating the plate. When multiple plates each having an integrated manifold aperture are placed together to form a cell or stack, the manifold apertures will align and together form a manifold that is formed from the same pieces of material as the separator plates. Such a manifold cannot be detached or otherwise removed from the cells/stack.

As used herein, the term "appropriately fluidly sealed" means fluidly sealed to the degree necessary for the relevant parts to perform their function in a safe manner without risking damage to the fuel cell or stack. For example, when a ducting that delivers a liquid coolant or hydrogen to a stack is appropriately fluidly sealed to the separator plates, the degree of sealing will be sufficient to avoid leakage of the liquid coolant or hydrogen (e.g. hermetically sealed), since such leakage could be dangerous and damage the fuel cell stack. In contrast, when a ducting that delivers air as a coolant or cathode oxidant gas is appropriately fluidly sealed to the separator plates, this requires that the connection between the ducting and separator plates is tight enough so that sufficient air can be delivered to the fuel cells and does not escape through the connection. For this reason, using air as a coolant and cathode oxidant gas is preferable (provided the design of the fuel cell stack permits this) to using liquid coolants and enriched oxygen, because the degree of sealing required is lower. Accordingly, in embodiments of the invention that may be mentioned herein, the separator plate is a cathode separator plate or a coolant separator plate.

In embodiments of the invention, the ducting may be formed from a plurality of ducting plates. As used herein, the term "ducting plate" refers to a part that both can act as a ducting for an individual plate or cell (dependent on the thickness of the ducting plate), and can be assembled with other parts having a similar profile in an interlocking manner to form a ducting for a single cell or multiple cell stack. Typically, a ducting plate has a C- or U-shaped cross-section, but a skilled person will appreciate that other cross sections are possible. Typically, the interlocking connection will comprise a gasket, and the ducting plates will be held together by compression plates located at each end of the ducting. The ducting plates may comprise features such as protrusions or fins to direct fluid flowing through the finally formed ducting into one or more specific fuel cells. The thickness of a ducting plate may correspond to the thickness of a separator plate, the thickness of multiple separator plates, the thickness of a cell, or the thickness of multiple cells.

During manufacture of a fuel cell or cell stack, the ducting plates are typically attached to a separator plate or set of multiple separator plates, depending on the thickness of the ducting plate, to form a product of uniform thickness (i.e. the thickness of the ducting plate corresponds to the thickness of the number of separator plates used). These products can then be stacked to form a cell or cell stack.

Advantageously, the use of ducting plates and the manufacturing process outlined above allows a ducting the size of a single cell to be prepared, which enables single cells to be tested for quality control before incorporation into a stack. The use of ducting plates also allows the degree of sealing of the ducting to be adjusted depending on the fluid which is to flow through the ducting, since the interlocking connection can be modified as required. A further advantage of using interlocking plates to form the ducting is a strong seal can be obtained without the use of adhesive. This means the ducting can be disassembled without damaging the ducting and/or separator plates, allowing for cells within the stack to be repaired.

When the ducting is formed from ducting plates, the ducting plates can easily be fabricated by a process such as 3D printing or manufactured through plastic molding. This enables a large number of highly specific shapes to be prepared with accurately manufactured interlocking portions to generate a strong seal between plates. Thus, when the ducting is intended to deliver a liquid coolant, it may be formed from a plurality of ducting plates, so as to provide a strong seal both within the ducting and between the ducting and the separator plates.

The invention will now be described with reference to the Figures.

FIG. 1a shows a conventional cathode separator plate 101. The separator plate 101 comprises a cathode flow field 102, and cathode manifold apertures 103 at each end of the flow field. The interface between the manifold aperture and flow field at the right hand side of the figure comprises a short underbridge 104 (circled). The reverse side 190 of the plate 101 is shown at the right hand side of Figure.

FIG. 1b shows a conventional anode separator plate 105 that is similar to the cathode separator plate 101. The anode separator plate 105 comprises an anode flow field 106, and anode manifold apertures 107 at each end of the flow field. The interface between the manifold aperture and flow field at the right hand side of the figure comprises a short underbridge 108 (circled). The reverse side 191 of the plate 105 is shown at the right hand side of Figure.

FIG. 1c shows a conventional coolant separator plate 109. The coolant separator plate 109 comprises fluid flow channels 110 for a coolant fluid, and coolant manifold apertures 111 at each end of the fluid flow channels 110. The fluid flow channels interface directly with the manifold apertures 111 at the circled location 112. The coolant fluid flow channels in the plate shown do not comprise an underbridge.

Figure 2:
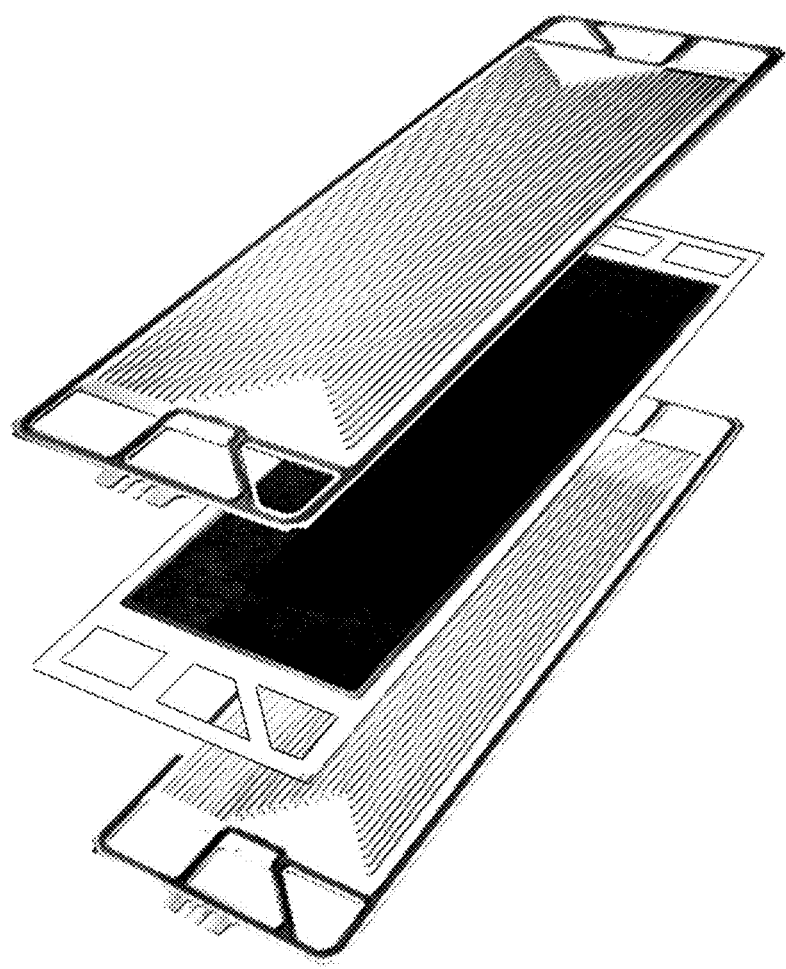

The separator plates shown in FIGS. 1a-1c can be aligned on top of each other as shown in FIG. 2. The manifold apertures will align, forming manifolds for the delivery of fuel gas to the anode plate, oxygen to the cathode plate, and coolant to the coolant plate. Once aligned and placed together with a catalyst coated membrane (the middle layer in FIG. 2), the fuel cell will be as shown in FIGS. 3a and 3b.

Figure 3A:
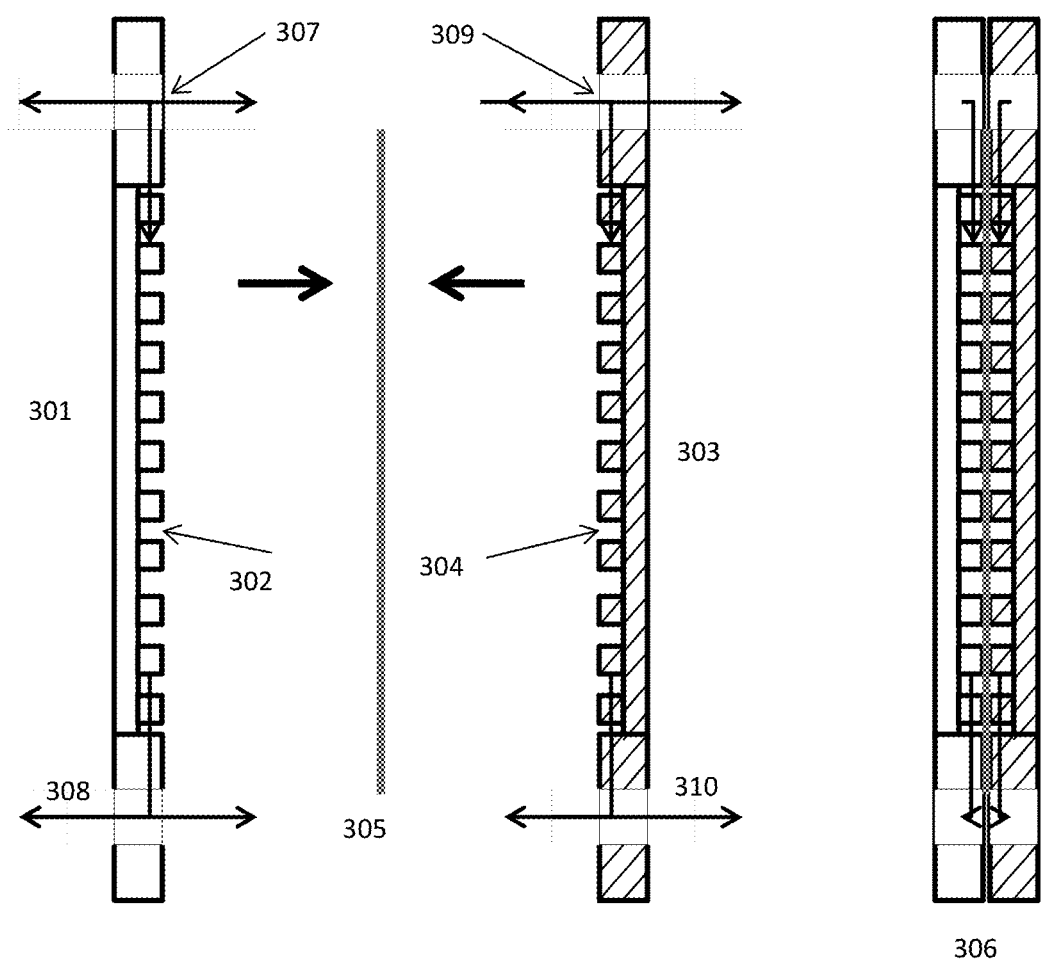
Figure 3B:
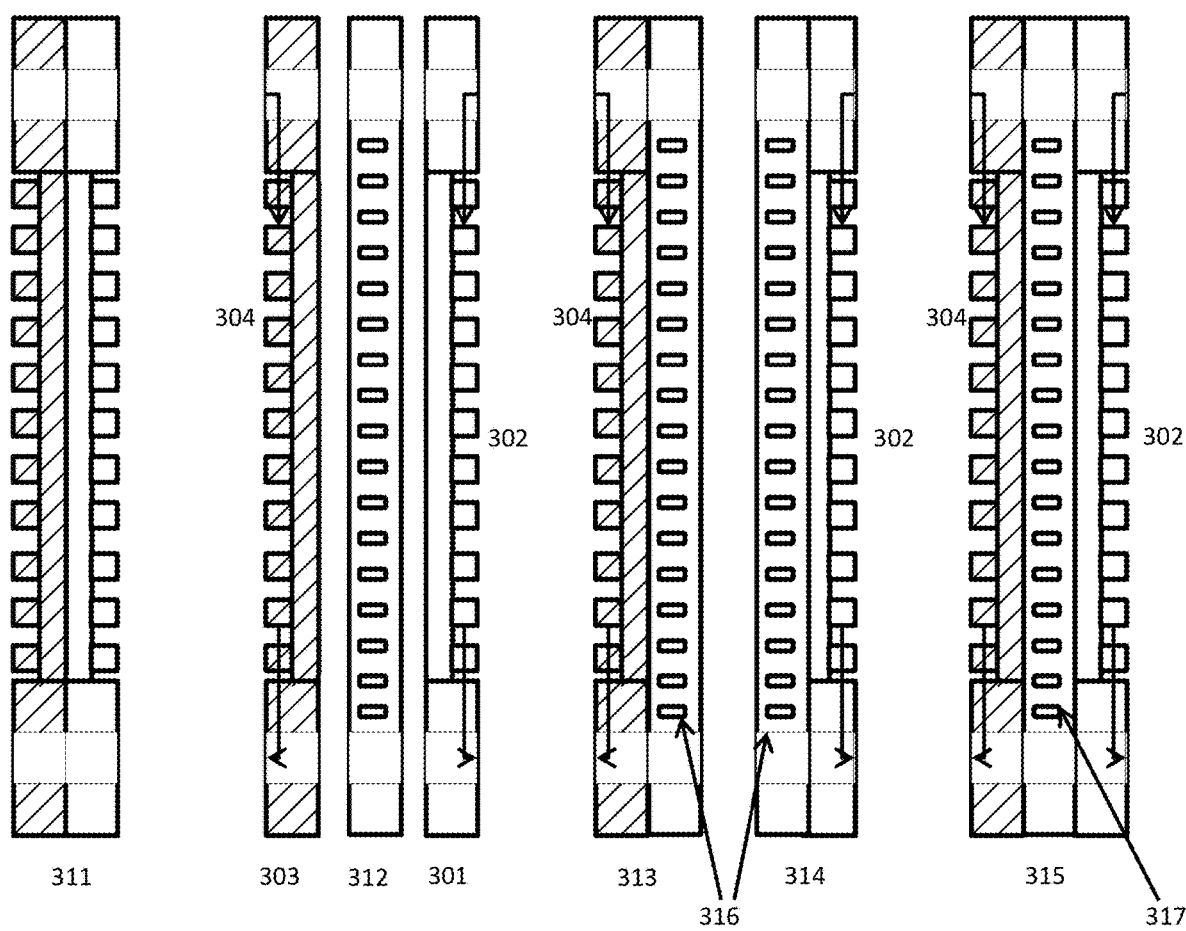

FIG. 3a shows a general schematic of a PEM fuel cell comprising an anode 301 comprising anode fluid flow channels 302, a cathode 303 comprising cathode fluid flow channels 304, and a catalyst coated membrane 305. When the components are placed together, they form a cell 306. During use, hydrogen gas is supplied to the anode 301 through inlet manifold 307, and flows through the anode fluid flow channels 302, and out through the outlet manifold 308. Oxygen gas (e.g. air) is supplied to the cathode 303 through inlet manifold 309, flows through the cathode fluid flow channels 304 and out through the outlet manifold 310.

The fluids flowing through the anode and cathode in the fuel cell must be in contact with the respective side of the membrane. A coolant is required in order to dissipate heat produced by the cell. The coolant can be supplied to a coolant plate located between fuel cells, or to the opposite side of an anode/cathode plate shown in FIG. 3b. Possible plate configurations for PEM fuel cells are shown in FIG. 3b, where the anode side of the plates is shown in white, and the cathode side shown with a hatched fill (i.e. as in FIG. 3a).

A first option is a plate having an anode on one side and a cathode on the other side as shown in plate 311, without a coolant plate. This is the configuration of an open-cathode fuel cell. This option does not involves the use of separate coolant—air flowing through the cathode fluid flow channels also serves to cool the fuel cell.

A second option is to use individual anode plates 301 and cathode plates 303 to form the cells, with separate coolant plates 312 located between the anode plate of one cell and the cathode plate of an adjacent cell.

A third option is to form the cells from plates having anode fluid flow channels 302 on one side and coolant fluid flow channels 316 on another side (plate 314), and plates having cathode fluid flow channels 304 on one side and coolant fluid flow channels 316 on another side (plate 313).

A fourth option is to use a plate similar to that of 311, but which has "channels" 317 for a coolant to flow within the plate, between the anode and cathode portions of the plate (shown in 315).

Figure 4:
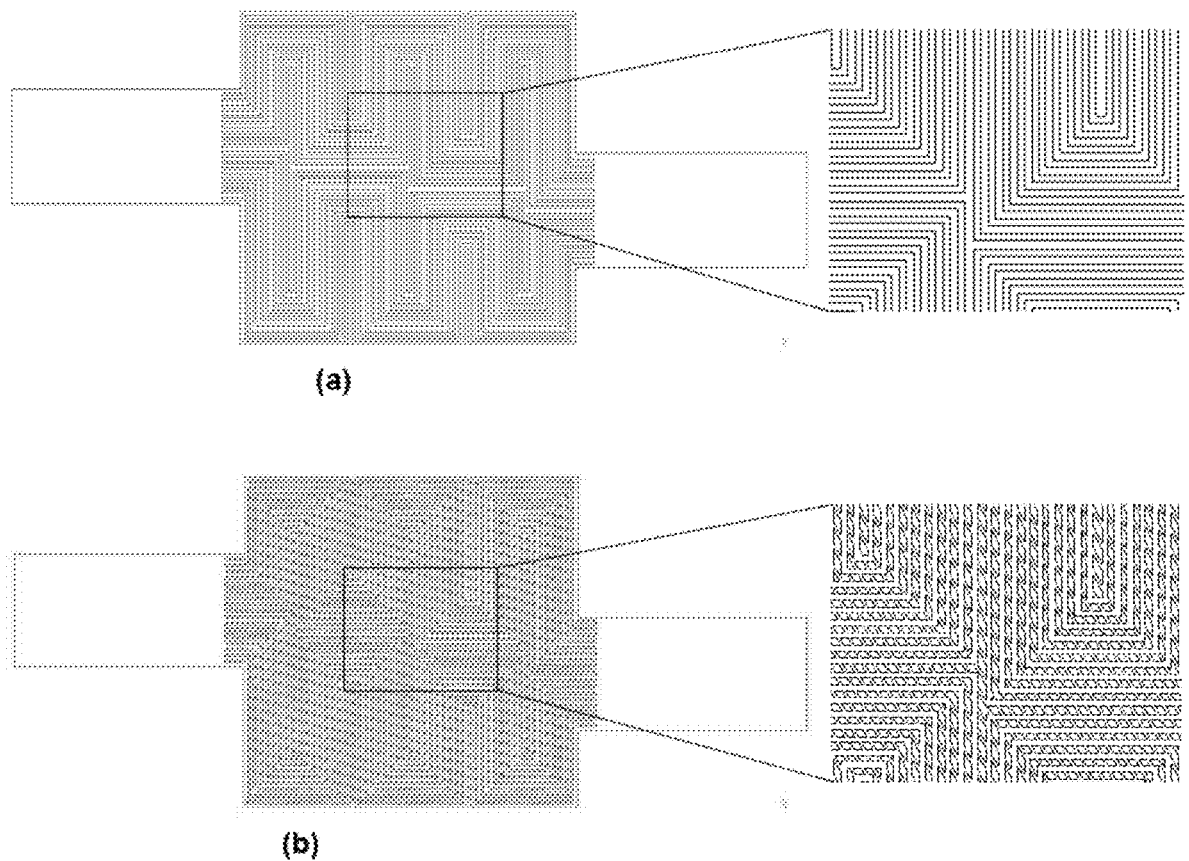
FIG. 4 shows examples of flow field patterns defined by fluid flow channels on a separator plate.
Figure 5:
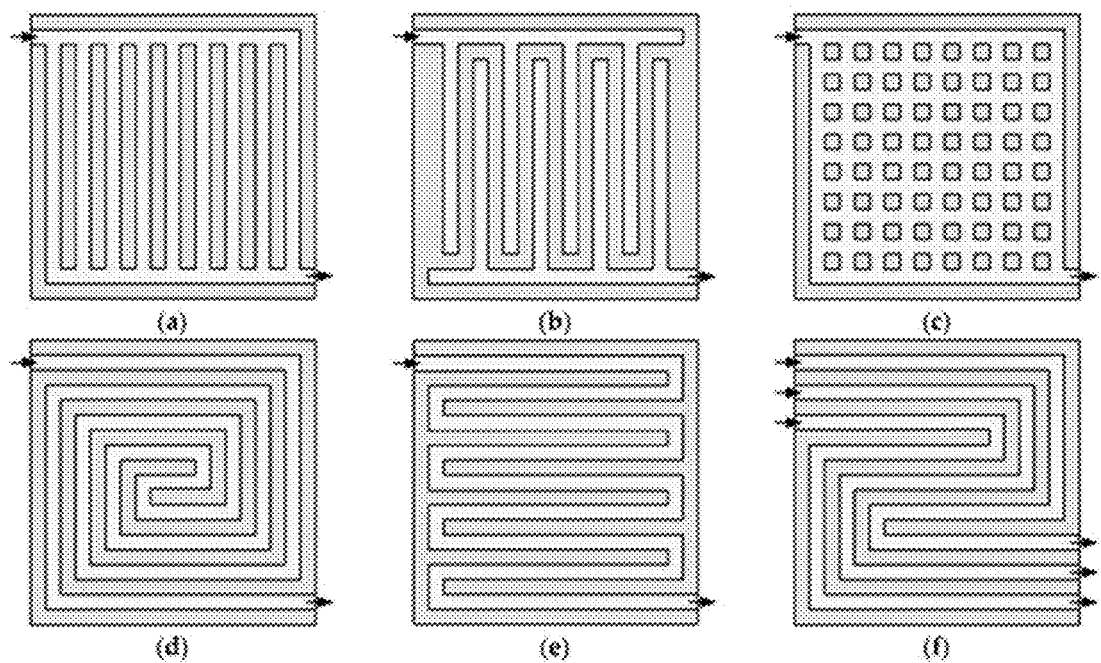
FIG. 5 shows further examples of flow field patterns defined by fluid flow channels on a separator plate.

The fluid flow channels can have varying shapes and configurations as discussed above. Examples of various configurations of the fluid flow channels within the flow field are shown in FIGS. 4 and 5. For example, the fluid flow channels can be formed from continuous ridges as in FIG. 4a, or from a series of protrusions as in FIG. 4b. Fluid flow channels formed from continuous ridges can have a variety of shapes/patterns, such as straight parallel (FIG. 5a), interdigitated (FIG. 5b), spiral (FIG. 5d), single-channel serpentine (FIG. 5e), and multiple-channel serpentine (FIG. 5f). Fluid flow channels formed from protrusions can also have a variety of patterns, and may be formed by protrusions having various shapes, such as oblique shapes (FIG. 4b) and squares (FIG. 5c). The layout of protrusions may be regular as in these figures, or may be irregular. The fluid flow channels may also be formed from another plate or layer, such as a mesh, that could be made of conductive material (FIG. 15). The use of mesh would decrease the resistance of flow within the region as compared to solid protrusions. The mesh pattern may incorporate the varying shapes and configurations discussed above.

A cathode separator plate 601 according to the invention is shown in FIG. 6a. The cathode plate 601 comprises fluid flow channels 602 extending from an inlet at a first edge portion 603 to a manifold aperture portion 604. The separator plate does not comprise an inlet manifold aperture for the cathode oxidant gas, but does comprise an outlet manifold aperture for the cathode oxidant gas 606. The plate comprises manifold apertures for the anode fuel gas 607, which is not delivered to the cathode separator plate 601. Instead, the manifold apertures form a manifold for delivering anode fuel gas to the anode(s) when the plate is assembled into a cell or stack. While the majority of the fluid flow channels 602 are formed from continuous ridges, the separator plate 601 comprises a plurality of protrusions 604 which define fluid flow channels to/from the fluid flow channels located furthest from the inlet and outlet portions 603 and 604. This helps to ensure that there is a good level of fluid flowing through all fluid flow channels 602.

FIG. 6b shows the cathode separator plate 601 connected to a ducting 608. In use, air (or an alternative oxygen source) is supplied through the ducting and enters the fluid flow channels 602 through the inlets at the first edge portion 603. The air flows along the fluid flow channels 602 where the oxygen reacts with protons permeating through the membrane of the cell (not shown) and electrons arriving at the cathode from an external circuit (not shown). This reaction produces water, which is expelled from the separator plate along with unreacted air through the outlets at the manifold aperture portion 604. The expelled air runs along the outlet manifold formed from the outlet manifold aperture 606 of the separator plate and the other separator plates which form the cell/stack.

Depending on the size of the stack, a greater or lesser volume of air may be required to maintain the desired stoichiometry or flow of oxygen to each cathode separator plate. The amount of air supplied is determined by the oxidant source (e.g. the pressure of the source) can easily be adjusted by providing a differently shaped/sized ducting, as shown in FIG. 6c, which corresponds to FIG. 6b except that a ducting 609 having a large cross sectional area is used. This does not require modification of the separator plate itself (or the other separator plates in the cell/stack), increasing the ease of manufacture. While the ducting of FIG. 6b is appropriate for a 50 cell stack, the larger ducting of FIG. 6c is appropriate for an 80 cell stack.

A 3D view of a ducting 701 is provided in FIG. 7a. The ducting 701 has a fixed length and is only appropriate for a stack of certain size (i.e. cell count). An adjustable ducting 702 is shown in FIG. 7b. This ducting is formed from three parts—two end parts 703a and 703b, and a central part 704 that fits inside the end parts in an appropriately fluidly sealed manner and along which the end parts may extendably slide. This allows the adjustable ducting 702 to be adjusted as required for different stack lengths: a longer configuration 705 is shown in the top left, while a shorter configuration 706 is shown in the top right. The central part may have a consistent cross-section, or as shown in FIG. 7b, it may have a contoured cross section 707 converging on a narrowest point at the middle of the central part. This aids to increase air resistance in the central part of the ducting when air is supplied from both ends, helping produce an even flow coefficient through all of the fluid flow channels of the separator plates.

An alternative ducting construction is shown in FIG. 8, in which the top drawing is a cross section through a ducting and fuel cell, showing a separator plate 801 and an interlocking ducting plate 802. The interlocking ducting plate 802 is mated to the separator plate 801 in an appropriately fluidly sealed manner 803, while the connection (sealing) between interlocking ducting plates is improved by use of a gasket 804. The interlocking ducting plates 801 can have a number of possible thicknesses, which are shown in the bottom four drawings in FIG. 8. Generally, the thickness of the interlocking ducting plates 801 will correspond to the thickness of an individual separator plate 801 (see 805), to the thickness of a two plate sub-cell comprising an anode or cathode separator plate and a coolant separator plate (see 806), to the thickness of a three plate sub-cell comprising an anode separator plate, a cathode separator plate and a coolant separator plate (see 807), or to the thickness of a complete cell comprising the three separator plates and a membrane electrode assembly (see 808).

A variant of the cathode separator plate 601 is shown in FIG. 9a. The separator plate 901 does not comprise an outlet manifold aperture (see 902). In use, as shown in FIG. 9b, a first ducting 903a is placed at the first edge portion 904, and a second ducting 903b at the second edge portion 905. The first ducting is shown comprising fins/protrusions 906 that manipulate or direct air (or other fluid) flowing through the ducting into the fluid flow channels 907 that are located near the fins/protrusions, thereby increasing the fluid flow rate through one or more of the fluid flow channels.

Another ducting variant is shown in FIG. 10. The left image shows a ducting 1001 comprising a recirculation portion 1002 configured to direct fluid flowing through a distal portion of the ducting 1003, relative to the one ducting inlet 1004, back round towards a portion 1008 of the ducting located proximal to the ducting inlet 1004, relative to the distal portion of the ducting 1003. The airflow is shown by arrows 1005. The recirculated air is directed towards one or more fluid flow channels located (within separator plates 1006) proximal to the ducting inlet (e.g. plate 1007) relative to the distal portion of the ducting. The re-entry location 1008 of the recirculation portion 1002 can be anywhere on the ducting, for example anywhere where it is desirable to increase the fluid flow rate through the fluid flow channels of a separator plate. This is shown in the right image, in which the re-entry location 1010 of the recirculation portion 1009 is further away from the ducting inlet than in the left image.

The fluid flow channels of the separator plates may have inlets on two edges of the separator plate, as shown in FIG. 11. In this case, the first edge portion 1101 extends substantially to a first edge of the separator plate 1102 and substantially to a second edge of the separator plate 1103, where the first edge is adjacent to the second edge. As shown in the two expanded images, the ducting 1104 covers the inlets 1105a to the fluid flow channels at the first edge 1102 (top left), and the inlets 1105b to the fluid flow channels at the second edge 1103 (top right). The fluid flow channels close to the inlets may be formed from protrusions that define fluid flow channels 1106 running across the main channel pattern, to aid the flow of fluid towards fluid flow channels located further from the inlets 1107.

Another advantage of the invention is discussed below with reference to FIGS. 12 and 13. FIG. 12 shows the air flow path of a conventional PEM fuel cell stack, in which air 1201 flows perpendicular to the fluid flow channel inlets along an inlet manifold. The air must make a 90° turn in order to enter the fluid flow channels, causing undesired turbulence and a pressure drop. The use of a ducting rather than a conventional inlet/outlet manifold allows openings/inlets to be incorporated at desired positions in the ducting, rather than being constrained to the ends of the manifold. As shown in FIGS. 13a and 13b, this allows air (or other fluid) 1301 to be provided such that it flows in (substantially) the same direction as the inlets to the fluid flow channels, allowing for improved flow through the fluid flow channels. The air can be provided through multiple ducting inlets, which may comprise multiple blowers or pumps incorporated in or attached to the ducting. The outlet ducting can also be configured in this way, allowing a smooth, and more laminar-like, flow through the separator plate.

FIG. 14 shows a ducting 1401 for supplying air to a cathode, where the ducting comprises mounts for two compressors/pumps/blowers 1410 at the two ducting inlets 1409. The ducting comprises a main portion 1402 that is adapted to supply air to the fluid flow channels of separator plates in a cell stack, and a recirculation portion 1403. The use of a compressor (or a pump or blower) at both ends of the ducting results in a more consistent fluid velocity and pressure throughout the ducting, especially at the inlets to the fluid flow channels.

FIG. 15 shows an example of a mesh plate 1501 that can be placed on top of a base plate 1505 to form the fluid flow channels of a separator plate. The mesh plate 1501 comprises a mesh region 1502 that will define fluid flow channels in conjunction with a base. Fluid may flow from inlets at a first edge portion 1503 to outlets at a second edge portion 1504, and a ducting can be fitted to the edge portions of the final separator plate as discussed herein. Although not shown in FIG. 15, the mesh could have inlets on two adjacent edges, in an analogous way to that shown in FIG. 11.

While the separator plates of the invention comprise fluid flow channels that run from an edge portion of the plate to another edge portion or manifold aperture portion, they may comprise manifold apertures that form a manifold for other fluids that are required by a cell but which do not flow through the separator plate. For example, as shown in FIG. 6, a cathode separator plate according to the invention may comprise manifold apertures for an anode fuel gas, i.e. an integrated anode inlet manifold aperture and integrated anode outlet manifold aperture.

When air is used as both the cathode oxidant gas and the coolant, it is possible to use the same ducting to deliver air to the inlets of the cathode separator plates and coolant separator plates, and/or to use the same ducting to expel air from the outlets of the cathode separator plates and coolant separator plates. Thus, if the separator plate is a two-sided separator plate having cathode fluid flow channels on one side, and coolant fluid flow channels on the other side (which fluid flow channels are not themselves in direct fluid communication), it is possible that the fluid flow channels may be connected to the same inlet and/or outlet ducting. As such, when the fluid flow channels are described as being fluidly separate, or not in fluid communication, these terms should be construed with this context. This configuration can simplify the design and manufacturing process, since no separate ducting/manifold for the cathode oxidant gas and coolant is necessary.

Alternatively, a fuel cell stack as described herein may comprise more than one inlet ducting, such as a first ducting to deliver cathode oxidant gas to the cathode fluid flow channels and a second ducting to deliver coolant to the coolant fluid flow channels. The fuel cell stack could additionally comprise a third ducting to deliver anode fuel gas to the anode fluid flow channels.

The ducting may comprise different channels, segments or portions that are configured to direct a portion of fluid flowing through the ducting to different fuel cells. For example, the ducting may comprise a first ducting portion configured to direct a first portion of fluid flowing through the ducting to a first set of fuel cells, and a second ducting portion configured to direct a second portion of fluid flowing through the first ducting to a second set of fuel cells. This can be advantageous as the humidity of air flowing through different cells can be adjusted as required based on specific the requirements of the cells in question.

The flow of fluid out of the fluid flow channels can be manipulated as required by including additional components or features in a fuel cell stack. For example, when air is used as the cathode oxidant gas, the air exiting the cathode fluid flow channels will be humid, due to the production of water in the fuel cell. This humid air can be drawn out of the fluid flow channels by a suction pump and recirculated to provide humid air to the cathode fluid flow channel inlets. Humid air is desirable because the permeable membrane between the anode and cathode must be wet in order to allow the flow of protons through the membrane. Accordingly, when the fuel cell stacks described herein comprise a humidification means, such means could comprise means for recirculating humid air from the outlet of the cathode fluid flow channels to the inlets of the cathode fluid flow channels. In embodiments of the invention, the fuel cell stack may comprise means or apparatus configured to increase the flow of fluid out of the cathode and/or coolant fluid flow channels, for example a suction pump. The suction pump may be configured to recirculate fluid to the inlets of the cathode and/or coolant fluid flow channels. Alternatively, the flow out of the fluid flow channels can be restricted in order to increase the pressure within the fuel cell(s). Thus, the fuel cell stack may comprise means or apparatus configured to restrict the flow of fluid out of the cathode and/or coolant fluid flow channels, such as a valve.

The ducting may be formed from an electrically and/or thermally insulating material, such as a polymer. This helps avoid undesired heat loss to the environment, and also reduces the risk of short circuiting the fuel cell, and the risk of an electrical injury due to contact with the ducting. Moreover, when the ducting is formed from a polymer suitable for 3D printing, the ducting can be manufactured in a cheap and straightforward manner. Examples of suitable polymers for 3D printing a ducting include polylactic acid (PLA), acrylonitrile butadiene styrene (ABS), nylon or acrylic. Examples of suitable polymers for molding of a ducting include polyether ether ketone (PEEK), polyphenylene sulfide (PPS), high density polyethylene (HDPE) and thermosets such as epoxy resins.

While above description of the invention discusses specific features, a person skilled in the art would understand that these features may be combined in any technically sensible way. For the avoidance of doubt, it is herein explicitly contemplated that any feature disclosed herein may be combined with any other feature disclosed herein in a technically sensible way.

The separator plate of the invention, and fuel cells/stacks comprising the separator plate provide numerous advantages over conventional separator plates.

1) The size of the ducting can easily be varied depending on the stack size, allowing for the necessary amount of oxidant gas/coolant (e.g. air) to be delivered to the fuel cells, without having to change the design of the plates. By ensuring that the cathode is always supplied with the necessary amount of air, water flooding in the cells can be avoided. The ease and cost-effectiveness of manufacture of the separator plates is also increased, because a single plate design can be used in stacks of varying lengths.

2) Since the design of the ducting can easily be changed, it can include fins, protrusions or other features designed to create or reduce turbulence in the ducting. These features allow to be directed into fuel cells that would otherwise be deficient in oxidant gas/coolant, e.g. those that are located far away from manifold inlet in a conventional cell.

3) The inner surface of the ducting can be contoured (e.g. to a narrower cross section further from the ducting inlet), to create a more even flow coefficient across individual cells. For example, a blower or pump could be placed at either end of the ducting, and the ducting gradually contour to a narrow point at the middle of the ducting, as shown in FIG. 7b.

4) Air flowing through a conventional manifold must make a 90° turn in order to enter a fuel cell. This requirement can be eliminated using a ducting in accordance with the invention, because the inlet to the ducting does not need to be at the end of the ducting. The inlet could be positioned such that air flowing through the inlet is already flowing in the same direction as the inlet to a fuel cell, which allows for a more laminar flow through the fuel cells. Furthermore, the ducting could comprise a mount for a blower or pump, such that a blower or pump can be positioned to direct air directly into the inlets of fluid flow channels.

5) In order to ensure that all cells receive air having the desired humidity, a humidifier could be incorporated into the ducting, or at multiple inlets to the ducting. This is in contrast to conventional cell stacks where a humidifier can only be located at the inlet at the end of the manifold. This can be combined with the advantage discussed in 2) above, to direct humidified air into cells that would otherwise be deficient in humidified air. Furthermore, the ducting could comprise different portions or segments to direct different portions of air to different fuel cells, allowing air of different humidities to be supplied to different fuel cells.

6) When a ducting is located at the outlet end of the fluid flow channels, the outlet of the ducting can be restricted in order to easily increase the back pressure within all of the fuel cells.

7) Moist air expelled from the cathode fluid flow channels can be recirculated to the cathode inlets.

8) The ducting can be formed from an electrically and thermally insulating material. This helps avoid undesired heat loss to the environment, and also reduces the risk of short circuiting the fuel cell, and the risk of an electrical injury due to contact with the ducting.

9) Since manifold apertures can be eliminated, the total amount of material used to manufacture the separator plates is reduced, resulting in cost savings. This applies both for machined plates, where the overall amount of raw material is reduced, and sheet-metal formed/stamped-out plates, where resources are saved from reduced mold/die size. Moreover, separator plates having a standard design will be suitable for cell stacks of varying sizes, allowing manufacturing costs to be reduced.

10) When a ducting formed from a single part is used, it is easier to obtain the desired level of sealing than for a traditional manifold. Sealing between windows of traditional cells is by compression sealing of gaskets between each plates—and a failure between any two plates will compromise the manifold as a whole. A unitary ducting also reduces the compression requirement between plates.

11) The compressibility of the fuel cells is more homogenous, meaning the force imparted by compression plates can be more effectively directed onto the actual reaction area.

12) Fluid leakages along gaskets is not uncommon, and in traditional cells leaks more frequently occur at the manifold. If the manifold is replaced by a ducting formed from a single part, then the total area requiring sealing is reduced, thereby reducing the likelihood of leaks. If the ducting is formed from a number of interlocking ducting plates, then even though the possibility for leaks still exists, the ducting plates can be disassembled to easily fix and replace any faulty part without damaging the rest of the cell. This is not possible in a traditional cell or stack, where if a leak occurs the entire cell/stack must usually be discarded.

13) The manifold aperture at the cathode and coolant outlets can be eliminated, reducing raw material costs and increasing ease of manufacture.

14) A blower or pump can easily be incorporated in the ducting, for example by including a mount in the ducting. This allows different blowers or pumps to be attached to the ducting depending on the level of airflow required.

15) The ducting may be formed from a plurality of ducting plates. This allows featured designed to manipulate or direct the flow of fluid to be easily incorporated into the ducting. It also allows ductings the size of a single cell to be prepared, enabling single cells to be quality tested. Furthermore, traditional sealing of plates and cells results in all plates/manifolds being subjected to the same compression. A ducting plates method construction allows the level of sealing to be adjusted as required, for example with less emphasis on sealing for the cathode as compared to the anode, This reduces the overall compression force required on the compression plates.

What is claimed is:

1. A separator plate suitable for use in a closed-cathode hydrogen proton-exchange membrane (PEM) fuel cell, the separator plate comprising a first set of fluid flow channels each extending from an inlet at a first outer edge portion of the separator plate to an outlet at a second outer edge portion or manifold aperture portion of the separator plate, wherein:
   the first set of fluid flow channels comprises two or more fluid flow channels, where the two or more fluid flow channels extend across the first outer edge portion; and
   an outer edge portion of the separator plate other than the first outer edge portion and the second outer edge portion or manifold aperture portion is configured to form part of an exterior surface of a closed-cathode hydrogen proton-exchange membrane (PEM) fuel cell,
   wherein the fluid flow channels define a flow field, and the separator plate comprises only one or two of the following (i) to (iii):
   (i) an integrated cathode inlet manifold aperture that extends beyond the edge of the flow field;
   (ii) an integrated anode inlet manifold aperture that extends beyond the edge of the flow field; and
   (iii) an integrated coolant inlet manifold aperture that extends beyond the edge of the flow field; and
   wherein the separator plate is adapted to connect to a ducting in an appropriately fluidly sealed manner when the separator plate is placed in a fuel cell stack, wherein the inlets at the first outer edge portion of the separator plate are configured to be in fluid communication with an inner ducting volume of the ducting.

2. The separator plate according to claim 1, wherein the separator plate is selected from:
   a cathode separator plate, an anode separator plate, and a coolant separator plate.

3. The separator plate according to claim 2, wherein the separator plate comprises the first set of fluid flow channels on a first face of the separator plate, and a second set of fluid flow channels on a second face of the separator plate.

4. The separator plate according to claim 3, wherein:
   (a) the first set of fluid flow channels are cathode or anode fluid flow channels and the second set of fluid flow channels are coolant fluid flow channels, or
   (b) the first set of fluid flow channels are cathode fluid flow channels and the second set of fluid flow channels are anode fluid flow channels, where the separator plate further comprises coolant fluid flow channels within the separator plate between the cathode fluid flow channels and the anode fluid flow channels.

5. The separator plate according to claim 2, wherein the separator plate is a cathode separator plate.

6. The separator plate according to claim 2, wherein:
   the separator plate comprises a first corner formed by a first edge and a second edge adjacent to the first edge;

the first outer edge portion of the separator plate extends substantially to the first edge of the separator plate and substantially to the second edge of the separator plate; and the first set of fluid flow channels comprises a plurality of fluid flow channels that extend across the first outer edge portion and substantially to the first and second edges of the separator plate.

7. The separator plate according to claim 1, wherein the first set of fluid flow channels each extend to an outlet at the second outer edge portion of the separator plate.

8. The separator plate according to claim 1, wherein the separator plate does not comprise one or more of the following:
- an integrated cathode inlet manifold aperture;
- an integrated anode inlet manifold aperture;
- an integrated coolant inlet manifold aperture;
- an integrated cathode outlet manifold aperture;
- an integrated anode outlet manifold aperture; and
- an integrated coolant outlet manifold aperture.

9. The separator plate according to claim 1, wherein the fluid flow the separator plate comprises one or two of the following:
- an integrated cathode outlet manifold aperture that extends beyond the edge of the flow field;
- an integrated anode outlet manifold aperture that extends beyond the edge of the flow field; and
- an integrated coolant outlet manifold aperture that extends beyond the edge of the flow field.

10. An article comprising a separator plate according to claim 1 and one ducting plate attached to the separator plate by an interlocking connection, where the ducting plate defines an inner ducting volume in fluid communication with the first set of fluid flow channels of the separator plate.

11. A closed-cathode hydrogen proton-exchange membrane (PEM) fuel cell comprising at least one separator plate as described in claim 1.

12. The closed-cathode hydrogen proton-exchange membrane (PEM) fuel cell according to claim 11, comprising a first ducting having at least one ducting inlet and an inner ducting volume in fluid communication with the at least one ducting inlet, wherein:
the inner ducting volume of the first ducting is in fluid communication with the first set of fluid flow channels of the at least one separator plate; and
the first ducting is formed from one or more interlocking ducting plates.

13. A closed-cathode hydrogen proton-exchange membrane (PEM) fuel cell stack comprising:
(i) two or more fuel cells, each of the two or more fuel cells comprising:
a first separator plate as described in claim 1; and
one or more additional separator plates; and
(ii) a first ducting having at least one ducting inlet and an inner ducting volume in fluid communication with the at least one ducting inlet, wherein:
the inner ducting volume of the first ducting is in fluid communication with the first set of fluid flow channels of the first separator plates; and
the one or more additional separator plates are arranged or adapted to accommodate the presence of the first ducting.

14. The closed-cathode hydrogen proton-exchange membrane (PEM) fuel cell stack according to claim 13, wherein the one or more additional separator plates are fluidly separated from said first ducting.

15. The closed-cathode hydrogen proton-exchange membrane (PEM) fuel cell stack according to claim 13, wherein:
the first separator plates are cathode separator plates; and
the first separator plates comprise a first corner formed by a first edge and a second edge adjacent to the first edge, where the first outer edge portion of the first separator plates extends substantially to the first edge of the first separator plates and substantially to the second edge of the first separator plates, and where the first set of fluid flow channels comprises a plurality of fluid flow channels that extend across the first outer edge portion and substantially to the first and second edges of the first separator plates; and wherein
the inner ducting volume of the first ducting is in fluid communication with the inlets of the first set of fluid flow channels of the first separator plates.

16. The closed-cathode hydrogen proton-exchange membrane (PEM) fuel cell stack according to claim 13, having one or more of the features selected from the following (a) to (j):
(a) the first ducting is shaped such that fluid approaching the inlets of the first set of fluid flow channels flows in a direction that is substantially parallel to the inlets of one or more of the first set of fluid flow channels with which the inner ducting volume is in fluid communication;
(b) the first ducting comprises at least two inlets;
(c) the first ducting is configured to increase or decrease the fluid flow rate through one or more of the fluid flow channels;
(d) the first ducting is shaped to restrict fluid flow through a portion of the first ducting;
(e) the first ducting comprises a recirculation portion configured to direct fluid flowing through a distal portion of the first ducting, relative to the at least one ducting inlet, towards one or more fluid flow channels located proximal to the at least one ducting inlet, relative to the distal portion of the first ducting;
(f) the first ducting comprises a first ducting portion configured to direct a first portion of fluid flowing through the first ducting to a first set of fuel cells, and a second ducting portion configured to direct a second portion fluid flowing through the first ducting to a second set of fuel cells;
(g) the first ducting comprises a humidification means located within the first ducting, where the humidification means is/are configured to humidify gas flowing through the first ducting;
(h) the first ducting comprises at least two inlets, and the closed-cathode hydrogen proton-exchange membrane (PEM) fuel cell stack comprises a humidification means proximal to the at least two inlets, where the humidification means is/are configured to humidify gas flowing through the first ducting;
(i) the first ducting comprises a mount for a blower or pump;
(j) the first ducting is formed from a thermally and/or electrically insulating material;
(k) the PEM fuel cell comprises a second ducting having at least one second ducting inlet and an inner ducting volume in fluid communication with the at least one second ducting inlet, where the inner ducting volume of the second ducting is in fluid communication with one or more fluid flow channels other than the fluid flow channels in fluid communication with the inner ducting volume of the first ducting.

17. The closed-cathode hydrogen proton-exchange membrane (PEM) fuel cell stack according to claim 13, wherein:
   (a) wherein the first separator plate comprises a set of cathode fluid flow channels on a first face of the first separator plate, and a set of coolant fluid flow channels on a second face of the first separator plate, and the closed-cathode hydrogen proton-exchange membrane (PEM) fuel cell stack comprises means or apparatus configured to increase a flow of fluid out of the cathode and/or coolant fluid flow channels; or
   (b) wherein the first separator plate comprises a set of cathode fluid flow channels on a first face of the first separator plate, and a set of coolant fluid flow channels on a second face of the first separator plate, and closed-cathode hydrogen proton-exchange membrane (PEM) fuel cell stack comprises means or apparatus for restricting a flow of fluid out of the cathode and/or coolant fluid flow channels.

18. The closed-cathode hydrogen proton-exchange membrane (PEM) fuel cell stack according to claim 13, wherein:
   (a) the first ducting is formed from a plurality of interlocking ducting plates; or
   (b) the first ducting is formed from a first end part, a second end part, and a central part that fits inside the first and second end parts in an appropriately fluidly sealed manner and along which the first and second end parts may extendably slide.

19. The closed-cathode hydrogen proton-exchange membrane (PEM) fuel cell stack according to claim 13, wherein the first ducting is formed from a polymer.

20. The closed-cathode hydrogen proton-exchange membrane (PEM) fuel cell stack according to claim 13, which is configured to be cooled by air.

* * * * *